United States Patent [19]
Yonezawa

[11] Patent Number: 5,483,079
[45] Date of Patent: Jan. 9, 1996

[54] APPARATUS FOR DETECTING AN IN-FOCUS POSITION OF A SUBSTRATE SURFACE HAVING A MOVABLE LIGHT INTERCEPTING MEMBER AND A THICKNESS DETECTOR

[75] Inventor: Yasuo Yonezawa, Zushi, Japan

[73] Assignee: Nikon Corporation, Tokyo, Japan

[21] Appl. No.: 402,559

[22] Filed: Mar. 13, 1995

Related U.S. Application Data

[63] Continuation of Ser. No. 120,060, Sep. 13, 1993, abandoned.

[30] Foreign Application Priority Data

Nov. 24, 1992 [JP] Japan .................................. 4-312546

[51] Int. Cl.$^6$ ................................................ G01N 21/86
[52] U.S. Cl. ................. 250/559.29; 250/548; 250/201.4; 356/387
[58] Field of Search ..................... 250/548, 561, 250/201.3, 201.4, 201.6; 354/403–409; 356/392–396, 382, 381

[56] References Cited

U.S. PATENT DOCUMENTS

| | | | |
|---|---|---|---|
| 3,721,827 | 3/1973 | Reinheimer | 250/201 |
| 4,620,089 | 10/1986 | Schlichting et al. | 250/201.4 |
| 4,798,948 | 1/1989 | Neumann et al. | 250/201.3 |
| 5,317,142 | 5/1994 | Noda et al. | 250/201.4 |

*Primary Examiner*—Edward P. Westin
*Assistant Examiner*—Que T. Le
*Attorney, Agent, or Firm*—Shapiro and Shapiro

[57] ABSTRACT

A position detecting apparatus detects a matching state of a position of a surface of a light-transmissive object with respect to a fiducial object plane of an objective optical system. Light transmitted through one-half of a pupil plane of the objective optical system is reflected by a front surface of the object through an opposite half of the pupil plane to a photoelectric detector. Light reflected from a rear surface of the object through the opposite half of the pupil plane is intercepted and prevented from reaching the detector.

16 Claims, 13 Drawing Sheets

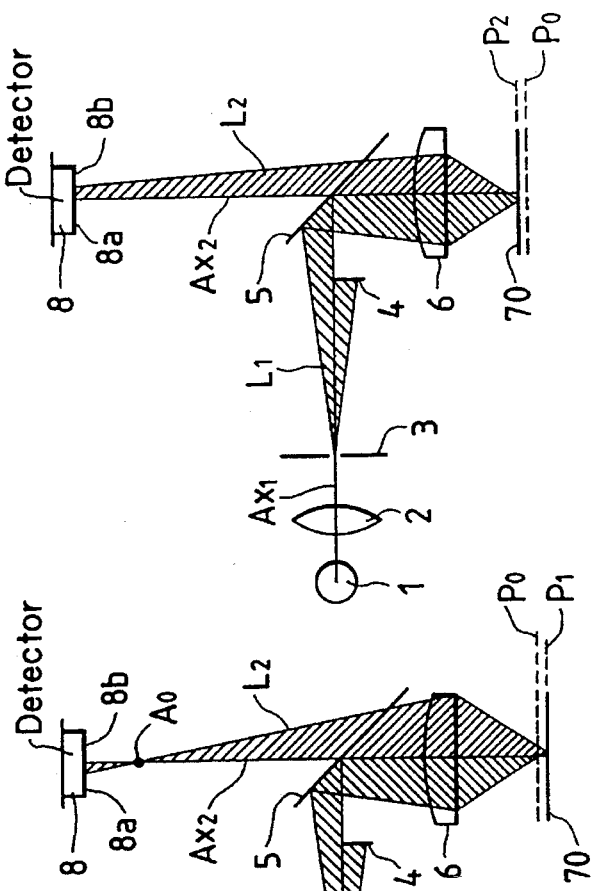

APPARATUS FOR DETECTING AN IN-FOCUS POSITION OF A SUBSTRATE SURFACE HAVING A MOVABLE LIGHT INTERCEPTING MEMBER AND A THICKNESS DETECTOR

This is a continuation of application Ser. No. 08/120,060 filed Sep. 13, 1993, now abandoned.

BACKGROUND OF THE INVENTION

1. Field of the Invention

The present invention relates generally to a position detecting apparatus for detecting a position of a substrate or the like as an object to be detected and, more particularly, to an apparatus suitable for detecting a focal point of, e.g., a microscope.

2. Related Background Art

A known focus detecting apparatus employed for a fall illumination type microscope is disclosed in, e.g., U.S. Pat. No. 3,721,827.

Now, the focus detecting apparatus disclosed in U.S. Pat. No. 3,721,827 will be described with reference to FIGS. 14A through 14C. Herein, FIG. 14A depicts an in-focus state where a detected surface 70 coincides with an object plane $P_0$ (fiducial plane) of an objective lens 6. FIG. 14B illustrates a defocus state where the detected surface 70 deviates downward from the object plane $P_0$ (fiducial plane) of the objective lens 6. FIG. 14C illustrates a defocus state where the detected surface 70 deviates upward from the object plane $P_0$ (fiducial plane) of the objective lens 8.

To start with, as depicted in FIG. 14A, the light emitted from a light source 1 is condensed by a condenser lens 2. A slit plate 3 formed with a slit opening is illuminated with the light, thus forming a slit illuminant. Then, the beam of light is split into two subbeams by a plane (perpendicular to the sheet surface of the figure) including an optical axis $Ax_1$ of the condenser lens 2. A light intercepting plate 4 intercepts one subbeam, a half (lower subbeam), of the beam through the slit plate 3. The other subbeam $L_1$, a half (upper subbeam), of the beam is reflected by a half-mirror 5. Thereafter, the beam $L_1$ reflected by the half-mirror 5 penetrates a left half (left half of the pupil of the objective lens 6) of an objective lens 6 and is converged on a detected surface 70 (a fiducial object plane $P_0$ of the objective lens 6).

An image of the opening of the slit plate 3 is formed on this detected surface 70. A beam of light $L_2$ reflected by the detected surface 70 passes through a right half (right half of the pupil of the objective lens 5) of the objective lens 6. Thereafter, the beam $L_2$ penetrates the half-mirror 5 and is converged on the light receiving surface of the photoelectric detector 8. Herein; an image of the opening of the slit plate 3 is formed.

The light receiving surface of the photoelectric detector 8 has light receiving areas 8a, 8b formed right and left of the boundary plane which includes an optical axis $Ax_2$ of this objective lens 6. An imaged state of the opening of the slit plate 3 is thus photoelectrically detected.

Further, as shown in FIG. 14B, the detected surface 70 is located in a position $P_1$ lower than a position $P_0$ of an object plane (fiducial plane) of the objective lens 6. In this case, the beam $L_2$ reflected by the detected surface 70 and penetrating the right half of the objective lens 6 is converged in front of the light receiving surface of the photoelectric detector 8. The beam $L_2$ then reaches the left area 8a of this light receiving surface. Herein, a slit image is formed in a converging position $A_0$ in front of the light receiving surface of the photoelectric detector 8. Therefore, this photoelectric detector 8 photoelectrically detects a defocus image of the slit 3.

Further, as depicted in FIG. 14C, the detected surface 70 is located in a position $P_2$ higher than the position $P_0$ of the object plane (fiducial plane) of the objective lens 6. In this instance, the beam reflected by the detected surface 70 and penetrating the right half of the objective lens 6 reaches the right area 8b of the light receiving surface so that the beam is converged in rear of the light receiving surface of the photoelectric detector 8. Then, the photoelectric detector 8 photoelectrically detects a defocus image of the slit 3.

Herein, the focus detection through the photoelectric detector 8 is conducted by taking a balance, i.e., a difference, between two quantity-of-light signals detected respectively by the right-and-left light receiving areas 8a, 8b of the photoelectric detector 8.

For instance, as illustrated in FIG. 14A, when in focus, the detection light is detected at the center of the light receiving surface of the photoelectric detector 8. For this reason, outputs of the two quantity-of-light signals are equal, these signals being detected respectively by the right-and-left light receiving areas 8a, 8b of the light receiving surface. A differential signal is thereby zeroed.

As shown in FIG. 14B, when the detected surface 70 is in a defocus state with a downward deviation from the object plane $P_0$ (fiducial plane) of the objective lens 6, the detection light is detected mainly by the left area 8a of the light receiving surface of the photoelectric detector 8. For this reason, an output signal assuming, e.g., a certain positive level is obtained with respect to the differential signal between the two quantity-of-light signals detected individually by the right-and-left light receiving areas 8a, 8b of the light receiving surface.

Besides, as illustrated in FIG. 14C, when the detected surface 70 is in a defocus state with an upward deviation from the object plane $P_0$ (fiducial plane) of the objective lens 6, the detection light is detected chiefly by the right area 8b of the light receiving surface of the photoelectric detector 8. Accordingly, an output signal assuming, e.g., a certain negative level is obtained with respect to the differential signal between the two quantity-of-light signals detected respectively by the right-and-left areas 8a of the light receiving surface.

In this manner, an out-of-focus direction can be detected depending on the negative or positive level of the differential signal by taking a difference between the two signals obtained from the photoelectric detector 8. An out-of-focus quantity can be detected in accordance with the output level of the differential signal.

By the way, in recent years, there has rapidly increased a rate of the liquid crystal display spreading in the sector of display devices, etc. It is therefore of importance to inspect a liquid crystal substrate as a base of the liquid crystal display. This liquid crystal substrate is examined mainly by a microscope. In an attempt at focusing on the surface of the liquid crystal substrate by use of the microscope incorporating the above-mentioned focus detecting apparatus, however, the photoelectric detector receives not only the reflected light from the liquid crystal substrate which is to be originally detected but also the reflected beam from the rear surface thereof. This exerts a large influence on a focus detection accuracy. Hence, the surface of the liquid crystal substrate can not be accurately detected in an in-focus state.

This therefore leads to a first problem wherein a defective product can not be exactly distinguished.

Further, in the conventional focus detecting apparatus described above, if the detected surface has a substantially uniform distribution of reflectivity as seen on a specular surface, a position of the detected surface is detectable with a high accuracy. However, in a conventional focal position detecting apparatus, there is detected a position of the surface formed with, e.g., patterns having a distribution of reflectivity (surface of the liquid crystal substrate or the like, on which predetermined patterns are formed). In this case, there arises a second problem of causing a remarkable decline in terms of a focusing accuracy due to a shift of the center of optical gravity of the detection light because of a non-uniform distribution of reflectivity on the surface when a magnification of the objective lens is low.

Under such circumstances, it is a primary object of the present invention, which obviates at least one of the first and second problems, to provide a position detecting apparatus capable of executing a positional detection of the detected surface with a high accuracy.

Then, it is one secondary object of this invention, which obviates the first problem, to provide a position detecting apparatus capable of detecting a position of the substrate surface with a high accuracy even when the reflected light appears from a rear surface of the substrate including a liquid crystal substrate.

It is another secondary object of this invention, which obviates the second problem, to provide a position detecting apparatus capable of executing a positional detection of the detected surface having a non-uniform distribution of reflectivity with a high accuracy even when a magnification of the objective lens is low.

Additionally, it is still another secondary object of this invention, which simultaneously obviates the first and second problems, to provide a position detecting apparatus capable of detecting a position of the substrate surface (detected surface) with a high accuracy even when the unnecessary reflected light is present from the surface of the substrate as a detected object and when the surface of the substrate as the detected object has a non-uniform distribution of reflectivity.

SUMMARY OF THE INVENTION

To accomplish the primary object, according to one aspect of the present invention, there is provided a position detecting apparatus for detecting a matching state of a position of a light-transmissive object with respect to a fiducial object plane of an objective optical system, said apparatus comprising:

an illumination system for projecting light to said object through a first part of said objective optical system at one side of a plane including an optical axis of said objective optical system;

a detector for photoelectrically detecting light reflected from a front surface of said object through a second part of said objective optical system at an opposite side of said plane; and a light intercepting member disposed on a light path between said objective optical system and said detector for preventing light reflected from a rear surface of said object, through said second part, from reaching said detector.

According to the construction given above, the light reflected from the rear surface of the object is intercepted. Only the light reflected from the front surface of the object can be extracted at a high efficiency. It is therefore possible to detect a position of the object (the matching state of the position of the object with the fiducial object plane of the objective optical system) with a higher accuracy. With this detection, the front surface of the object can be made coincident exactly with the fiducial object plane of the objective optical system, thereby attaining highly accurate focalization. Moreover, a great effect can be expected simply by adding an improvement to conventional apparatus.

Further, according to another aspect of the present invention, there is provided a position detecting apparatus for detecting a matching state of a position of a surface of an object with respect to a fiducial object plane of an objective optical system, said apparatus comprising:

a projection system for projecting a predetermined pattern on said surface of said object through a first part of said objective optical system at one side of a plane including an optical axis of said objective optical system;

a detector for photoelectrically detecting an image of said pattern reflected from said front surface of said object through a second part of said objective optical system at an opposite side of said plane; and an auxiliary optical system, disposed on a light path between said objective optical system and said detector, for varying a magnification of said pattern image formed on a light receiving surface of said detector.

According to the construction given above, even when the magnification of the objective optical system is low, there can be provided a highly precise detection of the position of a surface of the object (the matching state of the position of the detected surface with the fiducial object plane of the objective optical system) even though the detected surface exhibits a non-uniform distribution of reflectivity.

Moreover, according to still another aspect of the present invention, there is provided a position detecting apparatus for detecting a matching state of a position of a surface of an object with respect to a fiducial object plane of an objective optical system, said apparatus comprising:

a projection system for projecting a predetermined pattern on a front surface of said object through a first part of said objective optical system at one side of a plane including an optical axis of said objective optical system;

a detector for photoelectrically detecting an image of said pattern reflected from said front surface of said object through a second part of said objective optical system at an opposite side of said plane;

a light intercepting member, disposed on a light path between said objective optical system and said detector, for preventing light reflected from a rear surface of said object through said second part, from reaching said detector; and an auxiliary optical system, disposed on a light path between said objective optical system and said detector, for varying a magnification of said pattern image formed on a light receiving surface of said detector.

According to the construction given above, even when light is reflected from the rear surface of the object and, further, when the front surface of the object exhibits a non-uniform distribution of reflectivity, the position of the front surface of the object (the matching state of the position of the front surface of the object with the fiducial object plane of the objective optical system) can be detected with a much higher accuracy. With this detection, the front surface of the object can be made coincident exactly with the fiducial object plane of the objective optical system, thereby attaining highly accurate focalization.

Other objects and advantages of the present invention will become apparent during the following detailed discussion in conjunction with the accompanying drawings.

BRIEF DESCRIPTION OF THE DRAWINGS

FIG. 14A is a view showing an in-focus state where the detected object coincides with an object plane of an objective lens as well as schematically showing a construction of a conventional focus detecting apparatus;

FIG. 14B is a view showing a defocus state where the detected object deviates downward from the object plane of the objective lens as well as schematically showing the construction of the conventional focus detecting apparatus; and FIG. 14C is a view showing a defocus state where the detected object deviates upward from the object plane of the objective lens as well as schematically showing the construction of the conventional focus detecting apparatus.

DESCRIPTION OF THE PREFERRED EMBODIMENTS

To begin with, for an easier understanding of the present invention, the principle to eliminate the reflected light from a rear surface of a substrate as an object to be detected will be explained with reference to FIGS. 7 and 8 before the following discussion on each embodiment of the present invention.

Figure 8:
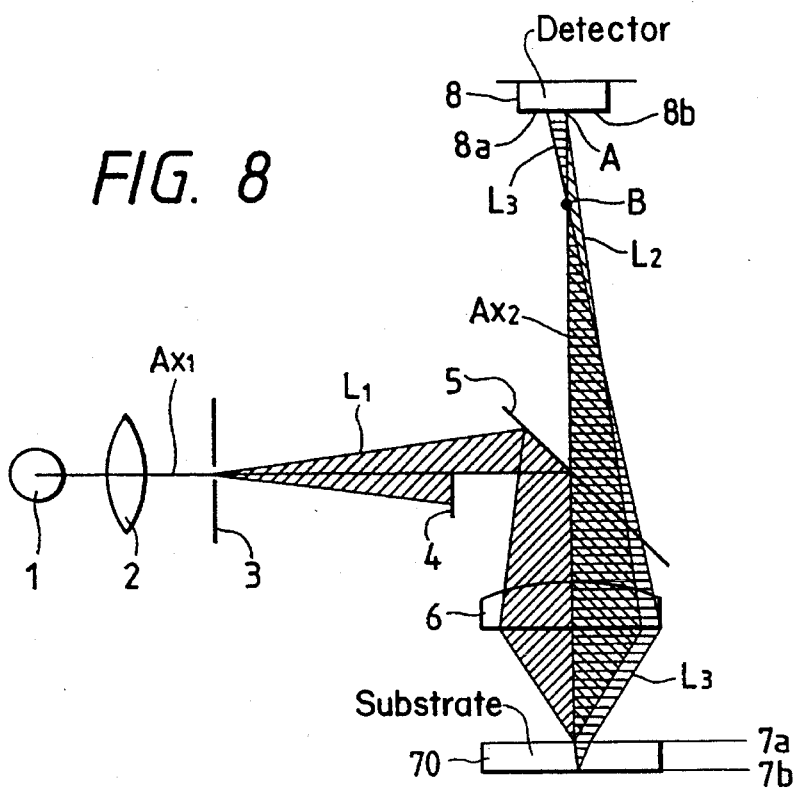
FIG. 8 is a view showing how the reflected light from the substrate rear surface is eliminated in a conventional focus detecting apparatus.

FIG. 8 is a view showing how a beam of reflected light $L_3$ from a rear surface $7b$ of the substrate is detected when a conventional focus detecting apparatus focalizes a substrate surface $7a$. As depicted in FIG. 8, a slit beam of light from a light source 1 is shaped through a slit plate 3 in combination with a condenser lens 2. An upper subbeam $L_1$ of the slit beam penetrating a left half of an objective lens 6 is converged on a substrate 7. A beam of light $L_2$ is reflected by a surface $7a$ (detected surface) of this substrate 7 and penetrates a right half of the objective lens 6. The beam $L_2$ is converged on a position A on a light receiving surface of a photoelectric detector 8.

On the other hand, the slit beam $L_1$ penetrating the left half of the objective lens 6 and converged on the substrate 7 penetrates the substrate surface $7a$ and is reflected by a rear surface $7b$ thereof. Then, a beam of reflected light $L_3$ from this rear surface $7b$ passes through the right half of the objective lens 6. The beam $L_3$ is thereafter converged on a position B in front of the light receiving surface $8a$ of the photoelectric detector 8. The beam $L_3$ is then received by a left area $8a$ of the light receiving surface of the photoelectric detector 8.

In this instance, a photoelectric signal obtained by the photoelectric detector 8 will be observed.

As illustrated in FIG. 8, an in-focus state is present on the substrate surface $7a$. Hence, due to the reflected beam $L_2$ from the substrate surface $7a$, though quantity-of-light signals obtained in the right-and-left light receiving areas of the photoelectric detector 8 are equal to each other with an optical axis $Ax_2$ of the objective lens 6 being centered therebetween, the substrate surface $7a$ is detected as a defocus (the substrate surface $7a$ is detected as located downwardly of the in-focus position) corresponding to an incidence light quantity of the reflected beam $L_3$ from the substrate rear surface $7b$ when falling on the left light receiving area $8a$.

Figure 7:
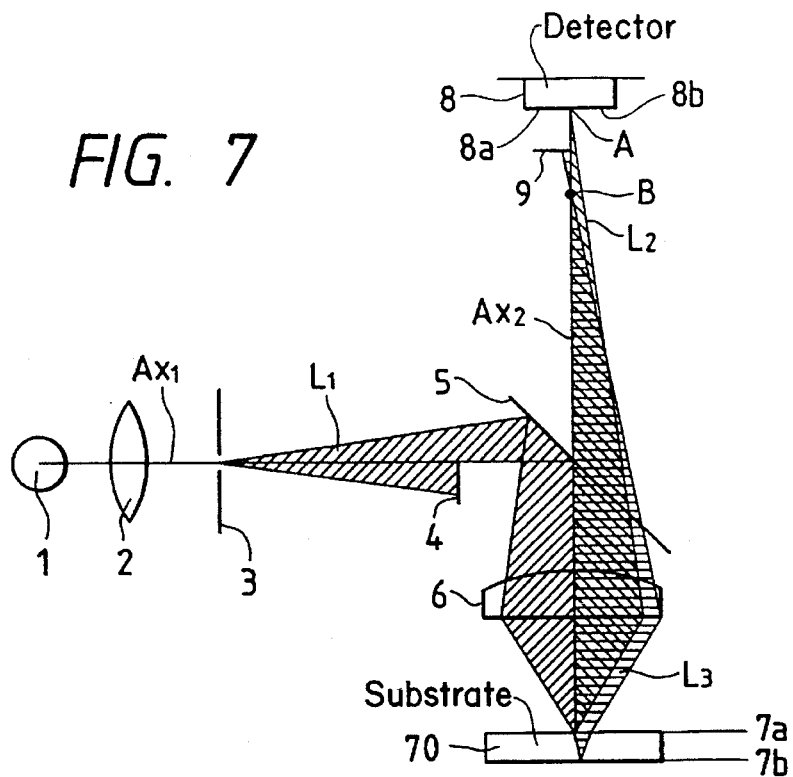
FIG. 7 is a view showing how a beam of reflected light from a substrate rear surface as a detected object is eliminated.

Now, according to the present invention, as illustrated in FIG. 7, a light intercepting member (light intercepting means) 9 intercepts the reflected beam $L_3$ from the substrate rear surface $7b$. The light intercepting member is spaced a predetermined distance from the light receiving surface (the position A conjugate to the substrate surface $7a$ when the substrate surface $7a$ is in focus) of the photoelectric detector 8. The light intercepting member 9 is provided also in a position at one side (left in FIG. 7) of a region halved by a plane including the optical axis $Ax_2$. Only the reflected beam $L_2$ from the substrate surface $7a$ can be thereby extracted with a high efficiency. It is therefore possible to detect a position of the substrate surface $7a$ with a remarkably high accuracy.

Herein, in the state where the substrate surface $7a$ is in focus, it is desirable that the light intercepting member 9 be disposed between the position B (conjugate to the substrate rear surface $7b$) on which the reflected beam $L_3$ from the substrate rear surface $7b$ is converged through the objective lens 6 and the light receiving surface position A (a position conjugate to the substrate surface $7a$) of the photoelectric detector 8.

The following is a concrete relationship of the arrangement of this light intercepting member 9. The surface $7a$ of the detected object is located (in-focus state) flush with the fiducial object plane $P_0$ of the objective lens 6 (objective optical system). In this case, a first position A is set conjugate to the surface $7a$ of the detected object. The surface $7a$ of the detected object is located (in-focus state) flush with the fiducial object plane $P_0$ of the objective lens 6 (objective optical system). In this instance, a second position B is set conjugate to the rear surface 7b of the detected object. It is desirable to satisfy the following condition (1):

$$0 < d < L \quad (1)$$

where L is the distance between the first position A and the second position B along the optical axis of the objective lens (6) (objective optical system), and d is the distance between the first position A and the light intercepting member 9 along the optical axis of the objective lens 6 (objective optical system 9).

The discussion given above has dealt with how the position of the surface of the substrate having a uniform thickness t is detected. For detecting a position of the surface of the substrate having a non-uniform thickness, however, the light intercepting member 9 is preferably so provided as to be movable in the directions along the optical axis Ax.

Next, the respective embodiments based on the principle shown in FIG. 7 will be explained with reference to FIGS. 1–6.

Figure 1:
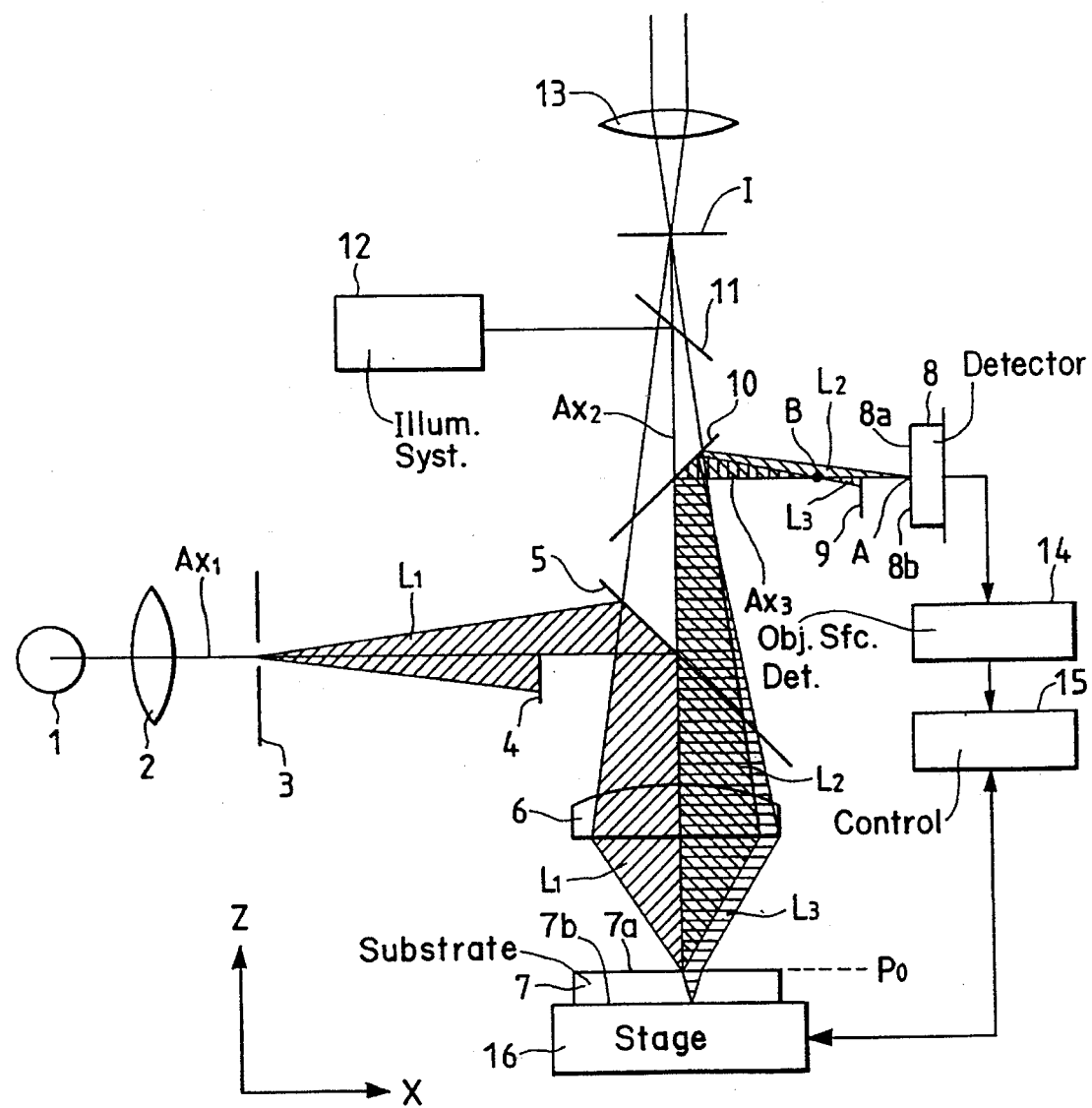
FIG. 1 is a view schematically illustrating a construction of a first embodiment in which a position detecting apparatus of the present invention is applied to a microscope.

FIG. 1 illustrates a first embodiment where the present invention is applied in the form of a focus detecting apparatus for a microscope. As depicted in FIG. 1, a beam of light of a visible region, which comes from a fall illumination system 12, is reflected by a half-mirror 11. The substrate 7 is illuminated with the light through a dichroic mirror 10 transmitting the visible light but reflecting the infrared light, a half-mirror 5 and the objective lens 6. This substrate 7 is placed on a stage 16. This stage 16 is so provided as to be movable two-dimensionally in X- and Y-directions by an unillustrated driving unit provided therein. The stage 16 is also movable in Z-directions (up-and-down directions).

Now, the substrate is illuminated with the visible light. Accordingly, the light reflected from the substrate surface 7a is imaged via the objective lens 6, the half-mirror 5, the dichroic mirror 10 and the half-mirror 11. The light thereafter penetrates an eyepiece 13.

Herein, a spatial image I of the substrate surface 7a is formed in the imaging position through the objective lens 6. The spatial image I of the substrate surface 7a is, when viewed through the eyepiece 13, observed as a magnified image. Note that the objective lens 6 and the eyepiece 13 are combined to constitute a viewing optical system.

On the other hand, the infrared light from the light source 1 undergoes the condensing action of the condenser lens 2. The slit plate 3 formed with the predetermined slit opening is thereafter illuminated with the infrared light, thereby forming a slit beam through this slit plate 3. A light intercepting plate 4 intercepts one subbeam (lower subbeam), a half, of the beam passing through the slit 3 but halved by the plane (perpendicular to the sheet surface of the figure) including an optical axis $Ax_2$ of the condenser lens 2. The other subbeam (upper subbeam) $L_1$, the remaining half thereof, is reflected by the half-mirror 5. Then, the beam reflected by the half-mirror 5 penetrates the left half (left half of the pupil of the objective lens 6) of the objective lens 6. The beam is converged on the substrate surface 7a, more strictly, on the object plane (fiducial plane) $P_0$ of the objective lens 6.

Herein, the slit plate 3 is, with respect to the objective lens 6, provided in the position conjugate to the object plane (fiducial plane) $P_0$ of this objective lens 6. An image of the opening of the slit plate 3 is formed on the object plane of this objective lens 6. Accordingly, the slit beam is substantially projected on the substrate surface as a detected surface. With this, the beam $L_2$ reflected by the substrate surface 7a travels through the half-mirror 5 as well as through the right half (right half of the pupil of the objective lens 6). Thereafter, the beam $L_2$ is reflected by the dichroic mirror 10 and converged on the light receiving surface of the photoelectric detector 8 such as a line sensor or the like.

The light receiving surface of the photoelectric detector 8 is, with respect to the objective lens 6, provided in the position conjugate to the object plane (fiducial plane)$P_0$ of the objective lens 6. This light receiving surface has first and second detection areas 8a, 8b located up and down relative to a position where an optical axis $Ax_3$ and the light receiving surface intersect each other. A light intercepting plate 9 intercepts an unnecessary reflected beam traveling on the lower side at the boundary of the optical axis $Ax_3$ but reflected from the substrate rear surface 7b. Then, the light intercepting plate 9 is provided in a position spaced a predetermined distance from the second detection area 8b. With this arrangement, it is possible to highly efficiently extract only the reflected beam $L_2$ reflected from the substrate surface 7a on the side of the first detection area 8a where the light intercepting plate is not disposed. Note that a partial light intercepting plate including a light transmitting part and a light intercepting part may be employed instead of the light intercepting plate 9, thereby intercepting the light from only an necessary area.

Now, two photoelectric signals are obtained from both of the first and second detection areas 8a, 8b on the light receiving surface of the photoelectric detector 8. These two photoelectric signals are outputted to an object surface detecting portion (focal position detecting portion) 14. This object surface detecting portion 14 includes a differential signal processing circuit for obtaining a differential signal between the two photoelectric signals. If the objective lens 6 is in focus on the substrate surface 7a, the differential signal is zeroed. Whereas if defocused, a certain differential signal corresponding to a defocus quantity is obtained. Hence, the object surface detecting portion 14 detects a position of the substrate surface 7a with respect to the object plane (fiducial plane) of the objective lens 6.

Thereafter, a piece of focus detecting information given from the object surface detecting portion 14 is inputted to the control unit 15. Based on this input information, the stage 16 is moved by a predetermined quantity in the up-and-down directions (Z-directions), thus effecting focalization.

Next, an optimum position of the light intercepting plate 9 will be examined. The light intercepting plate 9 incorporates a function to eliminate the reflected beam (unnecessary infrared light) $L_3$ from the substrate rear surface 7b. For this purpose, in a state where the substrate surface 7a is in focus, it is desirable that the light intercepting plate 9 be, it can be understood, disposed between the position B (conjugate to the substrate rear surface 7b) where the reflected beam $L_3$ from the substrate rear surface 7b is converged by the objective lens 6 and the photoelectric detector 8 (the position A conjugate to the substrate surface 7a).

Then, the arrangement condition of the light intercepting plate 9 will be expressed by formularizing this condition. The condition (2) goes as below:

$$0 < d < \left| \frac{2t\beta_1^2 f_{12}}{2t\beta_1 + nf_{11}} \right| \quad (2)$$

where d is the distance from the photoelectric detector 8 to the light intercepting plate 9 in the optical-axis direction, n is the refractive index of the substrate 7 with respect to a wavelength of the focus detection light, t is the thickness of the substrate 7, $\beta_1$ is the lateral magnification of the objective lens 6 when the substrate surface 7a is flush with the object plane (fiducial position) $P_0$ of the objective lens 6 (when in focus), $f_{11}$ is the focal length of the objective lens 6 on the side of the detected surface (object side), and $f_{12}$ is the focal length of the objective lens 6 (on the image side).

Further, it is desirable that the following condition (3) be satisfied to equalize a detection range in the case of the substrate surface 7a deviating upward from the fiducial object plane $P_0$ of the objective lens 6 to a detection range in the case of the substrate surface 7a deviating downward from the fiducial object plane $P_0$ of the objective lens 6 while eliminating the unnecessary reflected beam $L_3$ reflected by the substrate rear surface 7b.

$$d = \left| \frac{t\beta_1^2 f_{12}}{2t\beta_1 + nf_{11}} \right| \quad (3)$$

As described above, in this embodiment, the light intercepting plate 9 intercepts the unnecessary reflected beam $L_3$ from the substrate rear surface 7b. It is therefore possible to detect the position of the substrate surface 7a with respect to the object plane of the objective lens 6 with a high accuracy at all times. For this reason, the substrate surface 7a can be examined with the high accuracy through the viewing optical system 13).

Next, a modified example of the first embodiment shown in FIG. 1 will be explained referring to FIG. 2.

Figure 2:
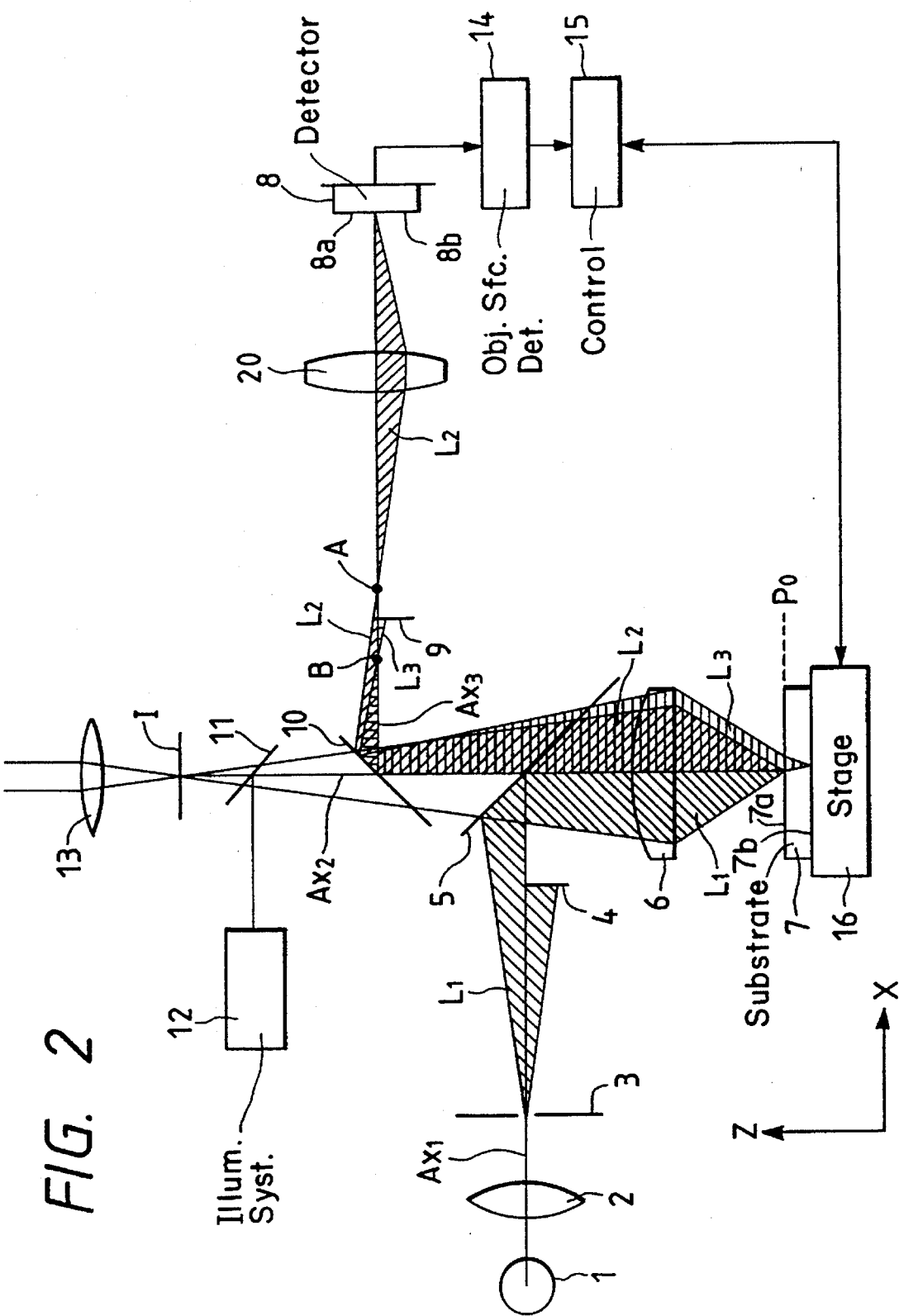
FIG. 2 is a view showing a modified example of the first embodiment illustrated in FIG. 1.

The following is a difference of the modified example illustrated in FIG. 2 from the first embodiment of FIG. 1. A relay optical system 20 is disposed between the objective lens 6 and the photoelectric detector 8. The relay optical system 20 serves to converge, on the light receiving surface of the photoelectric detector 8, the reflected beam $L_2$ converged on the predetermined position through the objective lens 6 but reflected from the substrate surface 7a. The light intercepting plate 9 is disposed in a position spaced a predetermined distance from the position A on which the reflected beam $L_2$ from the substrate surface 7a is converged through the objective lens 6 in the in-focus state. The configurations other than these points are the same as those in the first embodiment of FIG. 1. A detailed explanation about the modified example illustrated in FIG. 2 will therefore be omitted.

When the substrate surface 7a is in focus, it is desirable that the light intercepting plate 9 in the modified example of FIG. 2 be disposed between the position B (conjugate to the substrate rear surface 7b) on which the reflected beam $L_3$ from the substrate rear surface 7b is converged by the objective lens 6 and the position A (conjugate to the substrate surface 7a) on which the reflected beam $L_2$ from the substrate surface 7a is converged by the objective lens.

Herein, an optimum arrangement condition of the light intercepting plate 9 will be expressed by formularizing this condition. The first position A is set conjugate to the surface 7a of the detected object when the surface 7a of the detected object is located (in-focus state) flush with the fiducial object plane $P_0$ of the objective lens 6. The second position B is set conjugate to the rear surface 7b of the detected object when the surface 7a of the detected object is located (in-focus state) flush with the fiducial object plane $P_0$ of the objective lens 6. As in the case of the condition (2), the condition (4) goes as follows:

$$0 < d < \left| \frac{2t\beta_1^2 f_{12}}{2t\beta_1 + nf_{11}} \right| \quad (4)$$

where d is the distance from the first position A to the light intercepting plate 9 in the optical-axis direction, n is the refractive index of the detected object 7 with respect to a wavelength of the position detecting beam projected on the detected object 7, t is the thickness of the substrate 7, $\beta_1$ is the lateral magnification of the objective lens 6 when the surface 7a of the detected object is located flush with the fiducial object plane of the objective optical system (in-focus state), $f_{11}$ is the focal length of the objective lens 6 on the side of the detected surface, and $f_{12}$ is the focal length of the objective lens 6 on the side of the detector.

Further, it is desirable that, as in the above-mentioned condition (3), the following condition (5) be satisfied to equalize the detection range when the substrate surface 7a deviates upward from the fiducial object plane $P_0$ of the objective lens 6 to the detection range when the substrate surface 7a deviates downward from the fiducial object plane $P_0$ of the objective lens 6 while eliminating the unnecessary reflected beam $L_3$ reflected by the substrate rear surface 7b.

$$d = \left| \frac{t\beta_1^2 f_{12}}{2t\beta_1 + nf_{11}} \right| \quad (5)$$

As described above, in the modified example illustrated in FIG. 2 also, the light intercepting plate 9 intercepts the unnecessary reflected beam $L_3$ from the substrate rear surface 7b. It is therefore possible to detect the position of the substrate surface 7a with respect to the object plane of the objective lens 6 at a high accuracy all the time.

Next, a second embodiment of the present invention will be discussed with reference to FIG. 3. Paying attention to FIG. 3, the members having the same functions as those shown in FIG. 1 are marked with the like symbols.

The first embodiment described above has dealt with the example of detecting the position of the surface 7a of the substrate 7 having the uniform thickness with the high accuracy. In accordance with the second embodiment, however, there will be explained an example of highly accurately detecting a position of the surface of the substrate 7 having a non-uniform thickness.

Now, trying to detect the surface 7a of the substrate having the non-uniform thickness, the position A on which the reflected beam $L_3$ from the substrate rear surface 7b is converged through the objective lens 6 shifts along the optical axis $Ax_3$. For this reason, the elimination of the unnecessary reflected beam $L_3$ from this rear surface 7b requires an adjustment to move the light intercepting plate 9 along the optical axis $Ax_3$, corresponding to a variation in thickness of the substrate 7.

Figure 3:
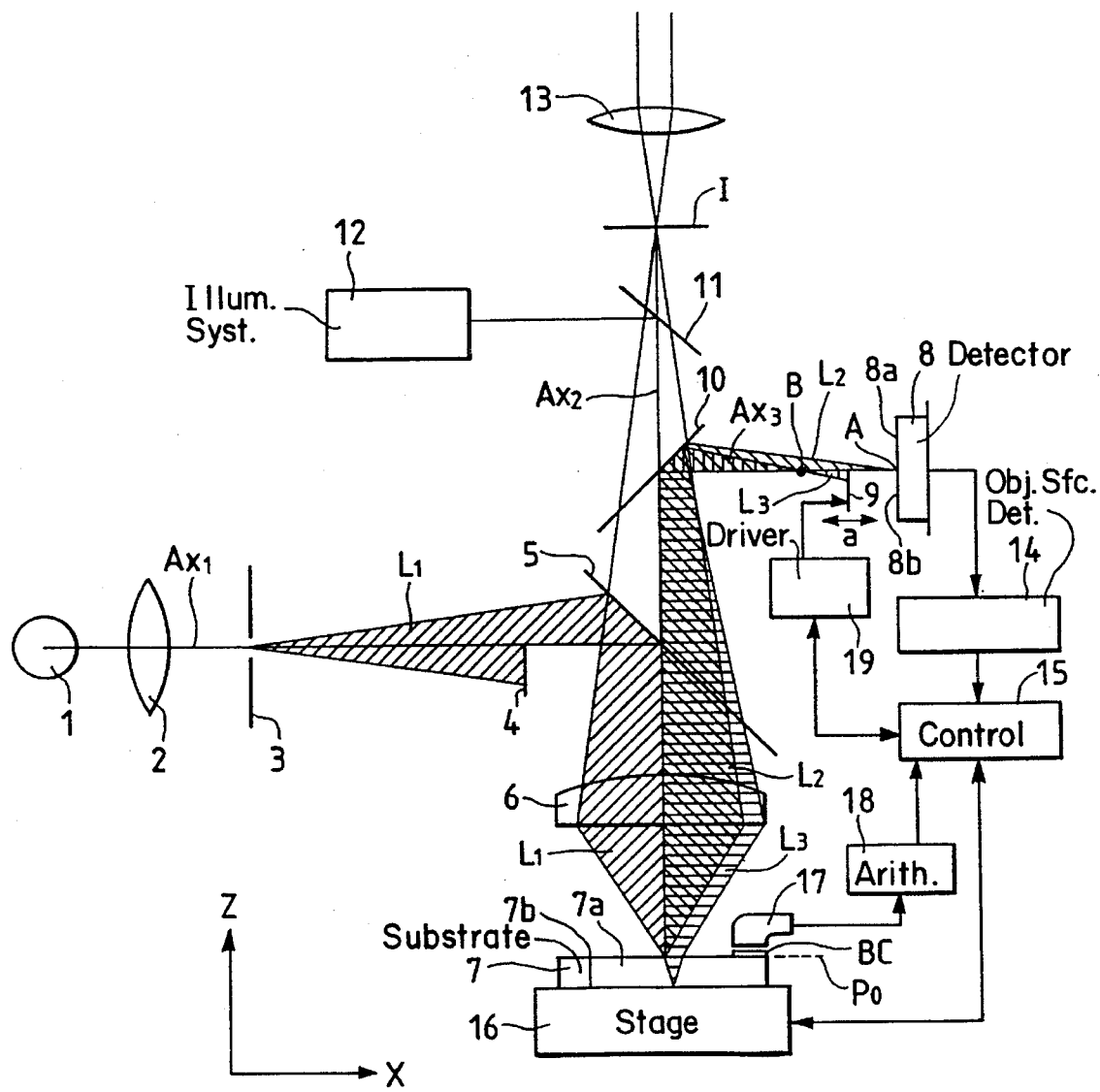
FIG. 3 is a view schematically illustrating a construction of a second embodiment in which the position detecting apparatus of this invention is applied to the microscope.

Then, in accordance with this embodiment, as depicted in FIG. 3, the light intercepting plate 9 is so provided as to be movable along the optical axis $Ax_3$ (in arrowed directions a) by means of a driving unit 19.

Now, there will be given a specific explanation of how to set a position of the light intercepting plate 9 in this embodiment. At the first onset, marks, e.g., bar codes BC, are formed at the edge of the substrate surface. The marks contain information on the thickness t, the refractive index n, etc., of the substrate 7. Then, an edge of the stage 16 is provided with a bar code reader 17 serving as a mark detecting means for reading the bar codes BC. The bar code reader 17 outputs, when reading the bar codes BC on the substrate 17, this information to an arithmetic unit 18 wherein a predetermined calculation is performed.

Stored beforehand in this arithmetic unit 18 is an arithmetic formula for the above-stated condition (2) or (3). The calculation is effected based on the information outputted from the bar code reader 17. A result of this calculation is outputted to the driving unit 19. Based on this calculation result, the driving unit 19 moves the light intercepting plate 9 in the directions (arrowed directions a) along the optical axis $Ax_3$. The light intercepting plate 9 is thus set in an optimum position corresponding to the thickness of the substrate 7.

With the construction described above, even when the thickness t of the substrate as a detected object varies, the light intercepting plate 9 can be set in the optimum position. It is therefore possible to highly accurately detect the position of the substrate surface 7a with respect to the object plane of the objective lens 6 at all times. For this reason, the substrate surface 7a can be examined with a much higher accuracy through the viewing optical system (6, 13).

Figure 4:
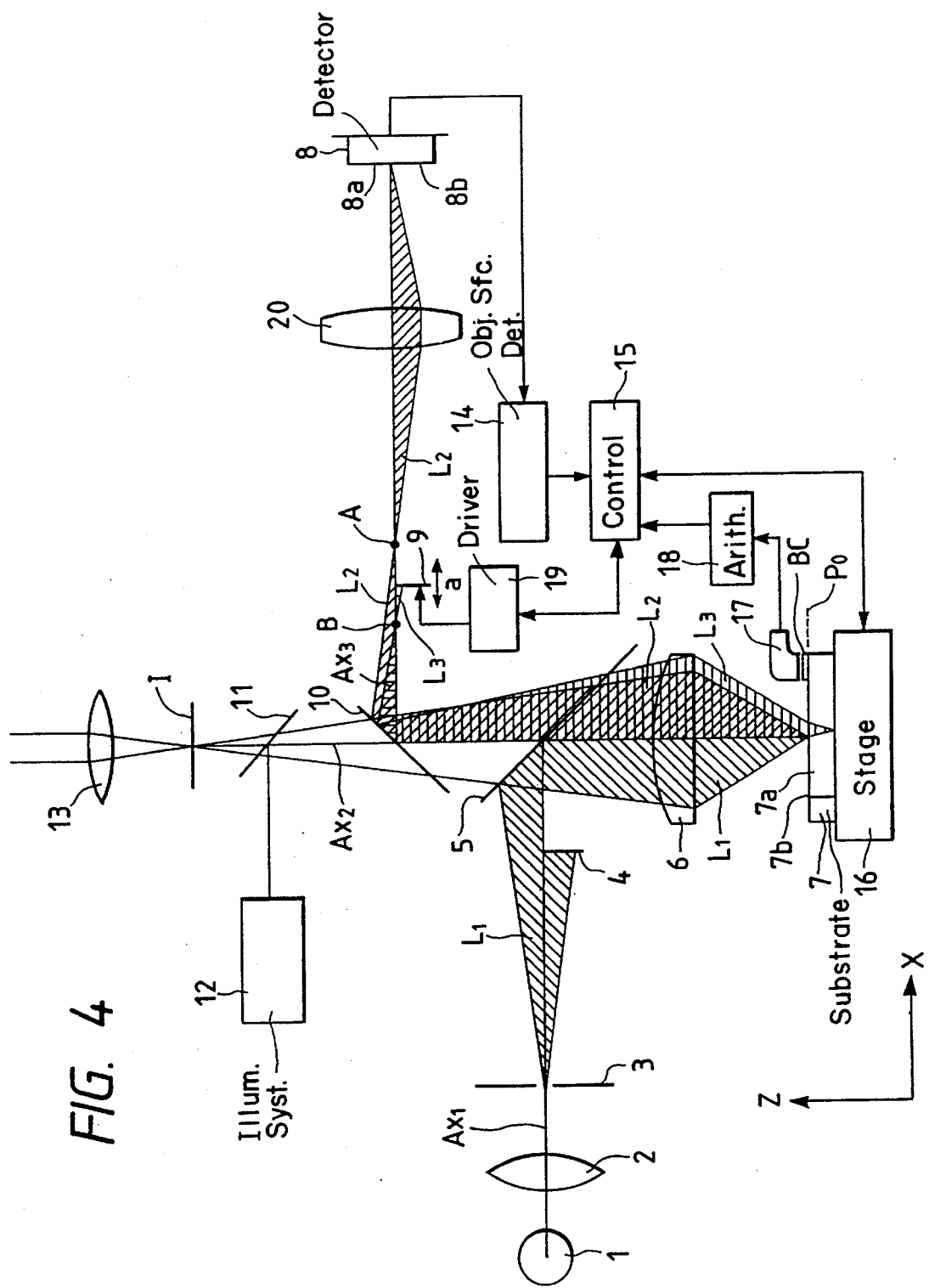
FIG. 4 is a view showing a modified example of the second embodiment illustrated in FIG. 3.

Incidentally, the following arrangement in FIG. 4 is also available. The relay optical system 20 works to converge, on the light receiving surface of the photoelectric detector 8, the reflected light converged on the predetermined position through the objective lens 6 but reflected from the substrate surface 7a. The relay optical system 20 may be, as depicted in FIG. 4, disposed between the objective lens 6 and the photoelectric detector 8. The light intercepting plate 9 may also be so provided as to be movable in the directions along the optical axis $Ax_3$ of the objective lens 6 in a position spaced a predetermined distance from the position A on which the reflected light from the substrate surface 7a is converged when in the in-focus state. In this case, the arithmetic unit 18 performs the calculation under the above-mentioned condition (4) or (5). The light intercepting plate 9 is set desirably in the optimum position.

Figure 5:
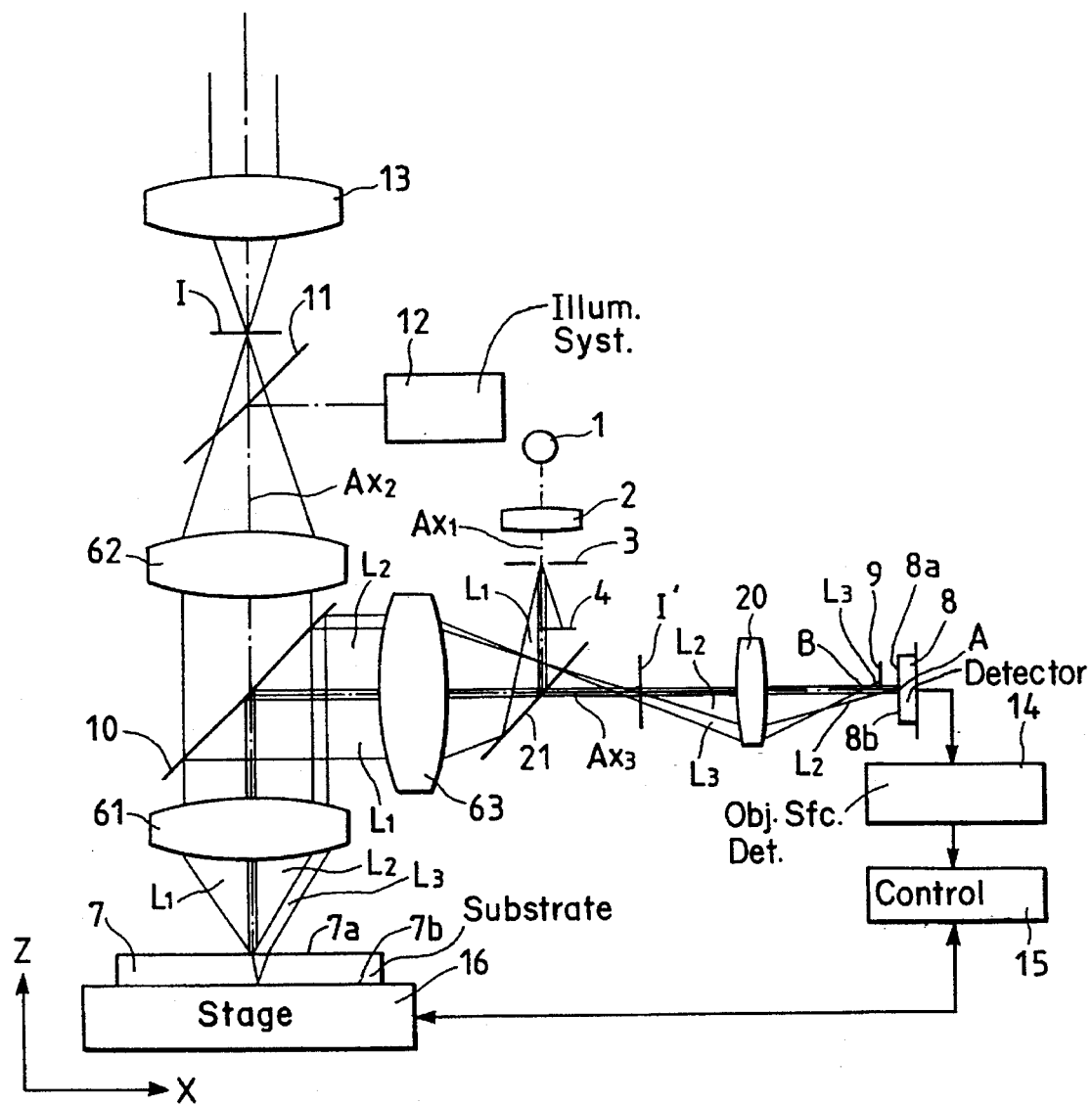
FIG. 5 is a view schematically illustrating a construction of a third embodiment in which the position detecting apparatus of this invention is applied to the microscope.

Given next is an explanation of a third embodiment where the apparatus of this invention is applied to a microscope in conjunction with FIG. 5. Referring to FIG. 5, the members having the same functions as those shown in FIG. 1 are marked with the like symbols.

A difference of the third embodiment from the first embodiment discussed earlier is such an arrangement that a spatial image I' of the detected surface is temporarily formed in the focus detecting optical system, and the spatial image I' reimaged by the relay optical system 20 is detected by the photoelectric detector 8.

This embodiment will be specifically explained. An object optical system is constructed of a first objective lens 61 for collimating the light from the substrate surface 7a (detected surface) into parallel beams of light and a second objective lens 62 for forming the spatial image I of the detected surface 7a by converging the parallel beams from this first objective lens 61. Then, the spatial image I is formed through both of the objective lenses 61, 62. The spatial image I of the detected surface is observed as a magnified image through the eyepiece 13.

A dichroic mirror 10 incorporating a function to transmit the visible light but reflect the infrared light is obliquely provided between the first and second objective lenses 61, 62. A third objective lens 63 for detecting a focal point is disposed in the reflecting direction of this dichroic mirror 10. Herein, an objective optical system for detecting the focal point (for detecting the position) is constructed of the first and third objective lenses 61, 63.

A beam of the infrared light from the light source 1 via the condenser lens 2 passes through the slit plate 3. A light intercepting plate 4 intercepts a rightward subbeam of infrared beam with respect to the optical axis $Ax_1$ of the condenser lens 2. Only a leftward subbeam $L_1$ with respect to the optical axis $Ax_1$ is reflected by a half-mirror 21. Then, this reflected beam is converged on the substrate surface 7a via the dichroic mirror 10 and a left half (a left half of the pupil of the first objective lens 61) of the first objective lens as well as via a lower half (a lower half of the pupil of the third objective lens 63) of the third objective lens 63. Herein, the slit plate 3 is provided in a position conjugate to the object plane (fiducial plane) $P_0$ of the first and second objective lenses with respect to the first and third objective lenses. An image of the opening of the slit plate 3 is substantially formed on the substrate surface 7a defined as a detected surface.

For this reason, a slit beam of infrared light is substantially projected on the substrate surface 7a as the detected surface. The infrared beam $L_2$ reflected by the substrate surface 7a passes through a right half (a right half of the pupil of the first objective lens 61) of the first objective lens, is reflected by the dichroic mirror 10 and passes through an upper half (an upper half of the pupil of the third objective lens 63) of the third objective lens 63. The infrared beam $L_2$ thereafter penetrates the half-mirror 21 to form the spatial image I'. The relay optical system 20 for relaying this spatial image I' is provided in this embodiment. The reflected beam $L_2$ traveling through a lower half of this relay optical system 20 is converged on the light receiving surface of the photoelectric detector 8.

The light receiving surface of this photoelectric detector 8 is provided in a position conjugate to the object plane (fiducial plane) of the objective optical system (61, 63), or in other terms, conjugate to the focal plane of the objective lens 61. The photoelectric detector 8 photoelectrically detects an imaged state of the opening image of the slit plate 3.

The object surface detecting portion 14 detects an in-focus state on the basis of a signal outputted from the photoelectric detector 8. Based on this detected result, the control unit 15 controls up-and-down positions of the stage 16.

In accordance with this embodiment, the light intercepting plate 9 eliminates the unnecessary infrared beam reflected from the substrate rear surface 7b. The light intercepting plate 9 is disposed between the position B (conjugate to the substrate rear surface 7b when the substrate surface 7a is in the in-focus state) on which the reflected beam $L_3$ from the substrate rear surface 7b is converged through the relay optical system as well as through the objective lenses (61, 63) during the focalization and the photoelectric detector 8 (the position conjugate to the substrate surface 7a when the substrate surface 7a is in the in-focus state).

Herein, the arrangement condition of this light intercepting plate 9 will be expressed by formularizing this condition. The condition (6) goes as below:

$$0 < d < \left| \frac{2t\beta_1^2\beta_2^2 f_{12} f_{22}}{2t\beta_1^2\beta_2 f_{12} - 2t\beta_1 f_{21} - nf_{11}f_{21}} \right| \tag{6}$$

where d is the distance along the optical axis from the light receiving surface 8a (the position A conjugate to the substrate surface 7a when the substrate surface 7a is in the in-focus state) of the photoelectric detector to the light intercepting plate 9, n is the refractive index of the substrate 7 with respect to a wavelength of the focus detection light, t is the thickness of the substrate 7, $\beta_1$ is the lateral magnification of the objective optical system (61, 63) when the substrate surface 7a is flush with the object plane (fiducial position) $P_0$ of the objective optical system (61, 63), $f_{11}$ is the focal length of the objective optical system (61, 63) on the side of the detected surface (object side), $f_{12}$ is the focal length of the objective optical system (61, 63) on the detection side (image side), $\beta_2$ is the lateral magnification of the relay optical system 20 when the substrate surface 7a is flush with the object plane (fiducial position) $P_0$ of the objective optical system (61, 63), $f_{21}$ is the focal length of the relay optical system 20 on the side of the detected surface (object side), and $f_{22}$ is the focal length of the relay optical system 20 on the detection side (image side).

Further, in accordance with this embodiment, it is desirable that the following condition (7) be satisfied for equalizing a detection range when the substrate surface 7a deviates upward from the fiducial object plane $P_0$ of the objective optical system (61, 63) to a detection range when the substrate surface 7a deviates downward from the fiducial object plane $P_0$ of the objective optical system (61, 63).

$$d = \left| \frac{t\beta_1^2\beta_2^2 f_{12}f_{22}}{2t\beta_1^2\beta_2 f_{12} - 2t\beta_1 f_{21} - nf_{11}f_{21}} \right| \quad (7)$$

As explained above, in this embodiment also, the unnecessary reflected beam from the substrate rear surface 7b can be intercepted by the light intercepting plate 9. It is therefore feasible to highly accurately detect the position of the substrate surface 7a with respect to the object plane (or the focal plane of the objective lens 61) of the objective lenses 61, 63 all the time.

Figure 6:
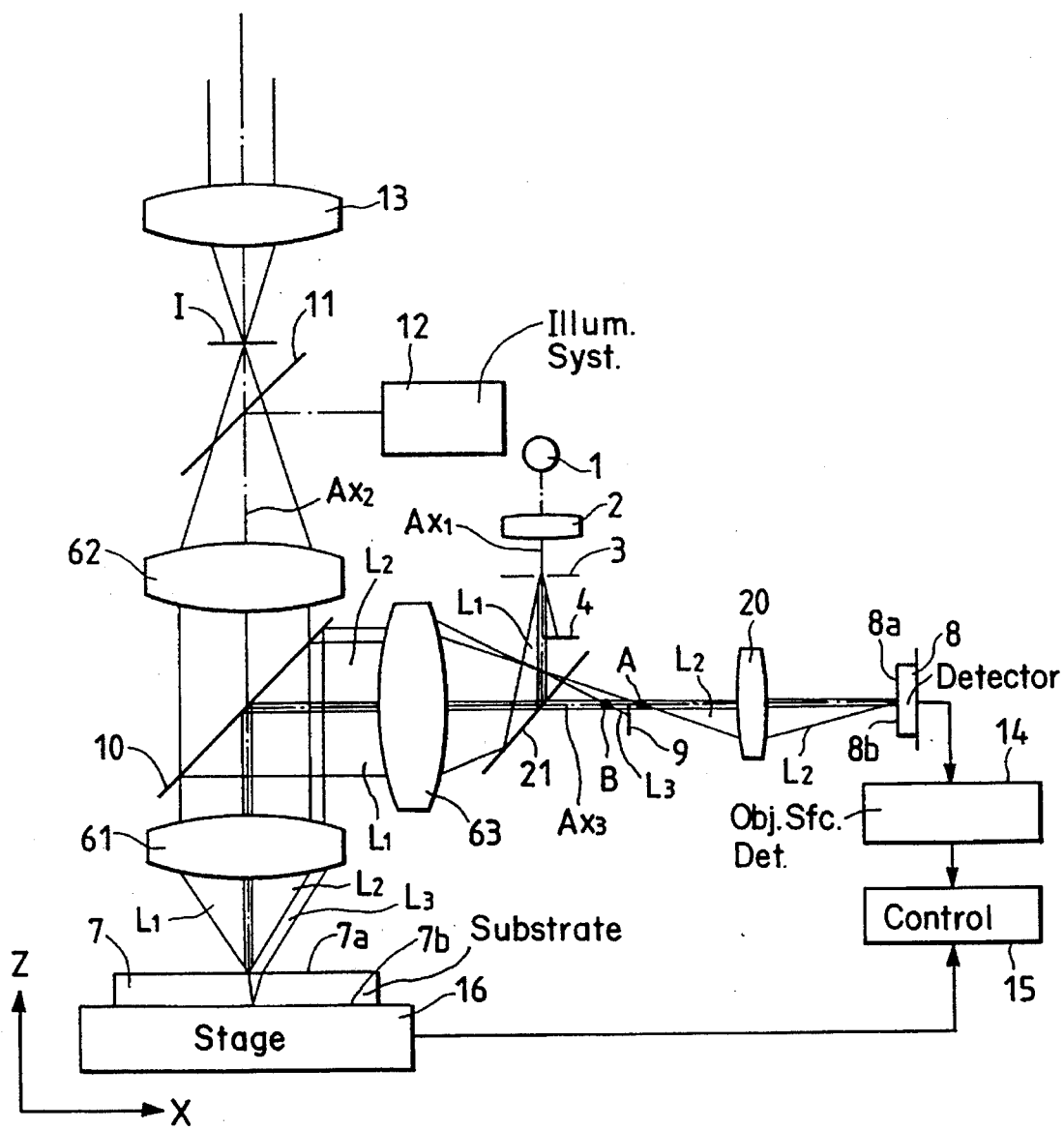
FIG. 6 is a view showing a modified example of the third embodiment illustrated in FIG. 5.

Note that the light intercepting plate 9 is, as illustrated in FIG. 5, not limitedly disposed in the position spaced the predetermined distance from the photoelectric detector 8. For example, as shown in FIG. 6, when the substrate surface 7a is in focus, the light intercepting plate 9 may be located between the position B (conjugate to the substrate rear surface 7b) on which the reflected light from the substrate rear surface 7b is converged through the objective optical system (61, 63) and the position A (conjugate to the substrate surface 7a) on which the reflected light from the substrate surface 7a is converged through the objective optical system. In this case, it is desirable to meet the above-stated condition (4) or (5).

Further, a second relay optical system may also be disposed between the relay optical system 20 and the photoelectric detector 8.

Moreover, in accordance with this embodiment, the marks such as bar codes are, as in the second embodiment of FIG. 3, formed at the edge of the substrate surface 7a. The calculation of the condition (6) or (7) is performed based on detection information of these marks. The light intercepting plate 9 may be set in an optimum position by moving the light intercepting plate along the optical axis on the basis of this calculation result.

In addition, the stage 16 is so provided as to be movable in the Z-directions for correcting a deviation of the detected surface (substrate surface) from the object plane of the objective optical system (61, 63) in each embodiment discussed above. Focusing may be conducted by moving the first objective lens 61 for collimating the light from the detected surface in the directions along the optical axis $Ax_2$. In this case, focusing can be performed simply by moving only the first objective lens 61 without moving the substrate as the detected surface.

Next, before discussions on the fourth through seventh embodiments of this invention, there will be explained a principle for removing a detection error caused if a reflectivity distribution on the detected surface is non-uniform with reference to FIG. 13.

A focal position detecting apparatus shown in each embodiment which will be mentioned later is provided with an auxiliary optical system for changing an imaging magnification on the detector. A positional detection of the detected surface can be thereby executed with a high accuracy by restraining a quantity-of-light center deviation quantity on the light receiving surface down to a small level even if a magnification of the objective lens is small.

Figure 13:
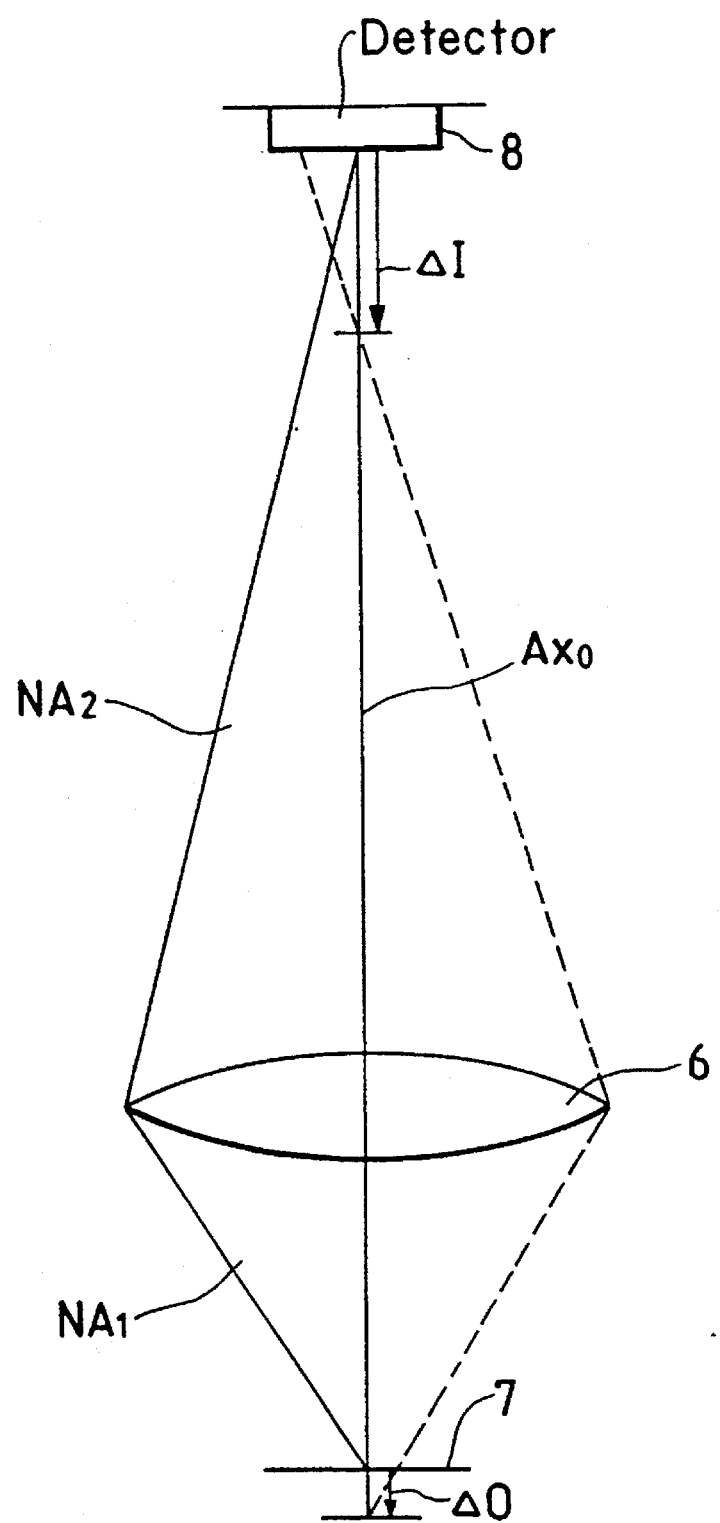
FIG. 13 is a view showing how a detection error is caused when a detected surface has a non-uniform distribution of reflectivity.

The attention is directed to FIG. 13, wherein an image of the substrate 7 defined as a detected surface is formed on the light receiving surface of the photoelectric detector 8. Herein, if, for instance, a high contrast pattern exhibiting a distribution of reflectivity is formed on the surface of the substrate 7, a quantity-of-light center of the image on the light receiving surface deviates by P. From this quantity-of-light center deviation quantity P, it may be assumed that the image of the substrate 7 shifts by $\Delta I$ from the light receiving surface. Hence, it is assumed in the photoelectric detector 8 that the image moves by $\Delta O$ from the actual position of the substrate 7. This is a defocus.

Then, a defocus quantity $\Delta I$ on the image side is proportional to the quantity-of-light center deviation quantity P but reversely proportional to a numerical aperture $NA_2$ if the objective lens 6 on the image side (on the side of the photoelectric detector 8). The defocus quantity is given by:

$$\Delta I = a \cdot P/NA_2 \quad (8)$$

where a is the coefficient. Further, the defocus quantity $\Delta O$ on the object side is given by:

$$\Delta O = \Delta I/\beta^2 \quad (9)$$

where β is the magnification of the objective lens 6. Then, the magnification β of the objective lens 6 is expressed such as:

$$\beta = NA_1/NA_2 \quad (10)$$

where $NA_1$ is the numerical aperture of the objective lens 6 on the object side (on the side of the substrate surface). From this, the defocus quantity $\Delta O$ is expressed by:

$$\Delta O = a \cdot P/(NA_1 \cdot \beta) \quad (11)$$

On the other hand, from a formula $\lambda/(2NA_1^2)$ relative to the focal depth and the formula (11), the condition for preventing the image from being out of focus is expressed such as:

$$a \cdot P/(NA_1 \cdot \beta) \leq \lambda/(2NA_1^2) \quad (12)$$

From this, the quantity-of-light center deviation quantity P is given by:

$$P \leq (\lambda/2a) \cdot (\beta/NA_1) \quad (13)$$

Accordingly, it can be understood from this formula (13) that the allowable quantity-of-light center deviation quantity P may be larger with greater $(\beta/NA_1)$.

Generally, if the magnification of the objective lens is high, $(\beta/NA_1)$ increases. Whereas if the magnification of the objective lens is low, $(\beta/NA_1)$ decreases. Hence, when the magnification of the objective lens is high, the defocus is not caused due to an influence of the pattern on the detected surface. When the magnification of the objective lens is low, however, the defocus is produced due to the influence of the pattern on the detected surface.

Then, it is possible to prevent the defocus when the magnification is low (when using the objective lens having the low magnification) by increasing the imaging magnification from the detected surface to the light receiving surface by use of the auxiliary optical system. Note that when replacing the low-magnification objective lens with the high-magnification objective lens in the case of employing this auxiliary optical system, there increases the numerical aperture $NA_2$ of a synthetic system of the high-magnification objective lens and the auxiliary optical system on the detection side. As a result, the quantity of light is deficient, and the detection accuracy declines. Therefore, in this case, it is desirable that the auxiliary optical system be retracted from the light path or be constructed to make the magnification of the auxiliary optical system changeably small.

As described above, there is provided the auxiliary optical system incorporating a function to increase the magnification on the image surface when using the low-magnification objective lens and a function to decrease the magnification on the image surface (light receiving surface) when using the high-magnification objective lens. With this provision, the defocus can be prevented both in the case of the low magnification and in the case of the high magnification.

Note that if the position detecting apparatus includes a position detecting optical system for only low magnifications detecting the detected surface only when using the low-magnification objective lens, the auxiliary optical system incorporating a function to increase the magnification on the light receiving surface may fixedly be disposed between the objective lens and the detector. Further, if the position detecting apparatus includes a position detecting optical system for only high magnifications detecting the detected surface only when using the high-magnification objective lens, the auxiliary optical system incorporating a function to decrease the magnification on the light receiving surface may fixedly be disposed between the objective lens and the detector.

Next, respective embodiments based on the principle illustrated in FIG. 13 will be explained with reference to FIGS. 9–12.

The following is an explanation of an embodiment where the focal position detecting apparatus of this invention is applied to the microscope. Note that the members having the same functions as those shown in FIG. 1 are marked with the like symbols in FIG. 9.

Figure 9:
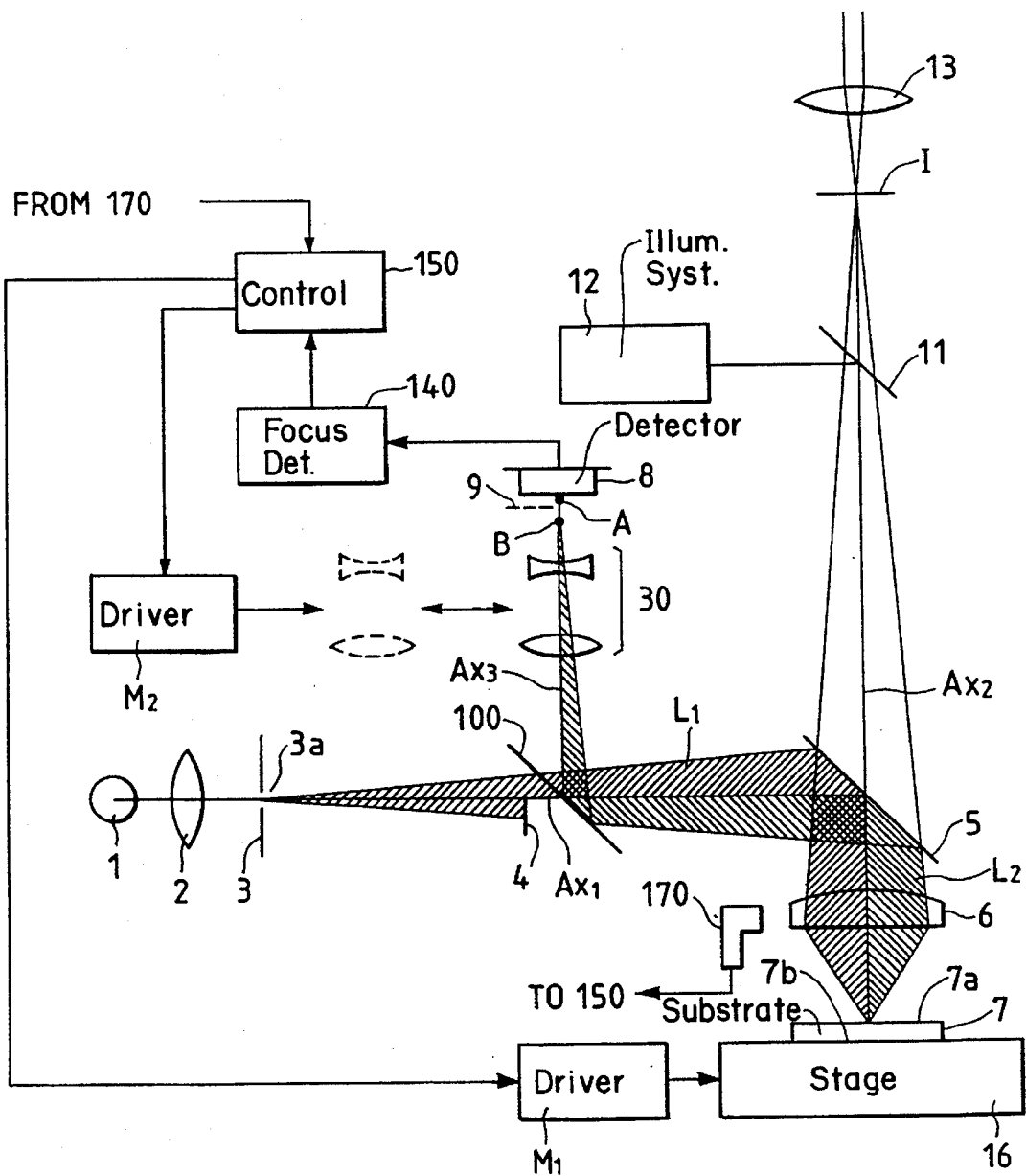
FIG. 9 is a view schematically illustrating a fourth embodiment in which the position detecting apparatus of this invention is applied to the microscope.

FIG. 9 is a view schematically illustrating a fourth embodiment of the present invention. Referring to FIG. 9, the light in the visible region from a light source 12 is reflected by the half-mirror 11. The light penetrates the dichroic mirror 5 which transmits the visible light but reflects the infrared light. Then, the objective lens 6 is provided in the transmitting direction of the dichroic mirror 5. An unillustrated revolver is fitted with this objective lens together with an unillustrated objective lens having a magnification different from that of the objective lens 6. With a revolution of this revolver, one of the objective lenses is so selected as to be located on the light path for the above-mentioned light. Then, the visible light via the objective lens 6 falls on the substrate 7. This substrate 7 is placed on the stage 16 so provided as to be movable in the XY- and Z-directions (the up-and-down directions on the sheet surface). This stage 16 is moved by a stage driving unit $M_1$.

Now, the substrate 7 is illuminated with the visible light. The light reflected from this substrate surface 7a is thereby imaged through the objective lens 6, the dichroic mirror 5 and the half-mirror 11. The light thereafter penetrates the eyepiece 13.

Herein, a spatial image of the substrate surface 7a is formed in an imaged-position I through the objective lens 6. When viewed through the eyepiece 13, the spatial image of the substrate surface 7a is observed as a magnified image. Note that the objective lens 6 and the eyepiece 13 are combined to constitute a viewing optical system. A magnification of the objective lens of the viewing optical system is varied with the revolution of the revolver. A viewing magnification can be thereby varied.

On the other hand, the infrared light from the light source 1 undergoes the condensing action of the condenser lens 2. The slit plate 3 formed with the slit opening 3a is thereafter illuminated with the infrared light, whereby a slit beam is emitted from this opening 3a. Then, a light intercepting plate 4 is provided on the outgoing side of the slit 3 in order to extracting one subbeam of this emitted beam at one side of a plane (in the perpendicular direction on the sheet surface in the figure) including an optical axis $Ax_1$ of the condenser lens 2. This light intercepting plate 4 intercepts one subbeam (lower subbeam). The other subbeam (upper subbeam) $L_1$ penetrating a half-mirror 100 is reflected by the dichroic mirror 5 and reaches the objective lens 6. This beam $L_1$ penetrates the left half of the pupil plane of the objective lens 6 and is converged on the substrate surface 7a, more strictly, on the object plane (fiducial plane) of the objective lens 6.

Herein, the slit plate 3 is, with respect to the objective lens 6, disposed in a position conjugate to the object plane (fiducial plane) of this objective lens 6. An image of the opening 3a of the slit plate 3 is formed on this object plane. Hence, the slit beam is substantially projected on the substrate surface 7a as the detected surface. The beam $L_2$ reflected by the substrate surface 7a is thereby, after penetrating the right half of the pupil plane of the objective lens 6, reflected by the dichroic mirror 5 and the half-mirror 100. The beam $L_2$ reaches the light receiving surface of the photoelectric detector consisting of a line sensor or the like.

The light receiving surface of the photoelectric detector 8 is, with respect to the objective lens 6, provided in a position conjugate to the object plane (fiducial plane) of the objective lens 6. When the substrate surface 7a defined as the detected surface is located flush with the object plane, the opening 3a is reimaged at the center on this light receiving surface. Further, when the substrate surface 7a is located downwardly of the object plane, the beam reaching the light receiving surface is converged on a position in front of the light receiving surface. A defocus image of the opening 3a is formed in a left area on the light receiving surface. Then, when the substrate surface 7a is located upwardly of the object plane, the beam from the objective lens 6 reaches the light receiving surface so that the beam is converged on the rear side of the light receiving surface. A defocus image of the opening 3a is formed in a right area from the center on this light receiving surface. Then, the photoelectric detector 8 transmits a photoelectric conversion signal relative to the beam reaching the light receiving surface to a focus detecting portion 140 serving as an object surface detecting portion. This focus detecting portion 140 detects the position of the substrate surface 7a with the aid of this photoelectric conversion signal. The focus detecting portion 140 transmits a detection output to a control unit 150. Based on this detection output, the control unit 150 controls the stage driving unit $M_1$, whereby the stage 16 is moved in the Z-directions. The substrate surface 7a can be thereby made coincident with the fiducial object plane of the objective lens 6.

Now, in accordance with this embodiment, the objective lens having the high magnification is replaced with the one having the low magnification by revolving the revolver mentioned above. In this instance, there decreases the imaging magnification of the opening 3a reimaged on the light receiving surface of the photoelectric detector 8. Consequently, there is a possibility where the positional detection of the substrate surface 7a becomes inaccurate.

Then, in accordance with this embodiment, when employing the low-magnification objective lens, a magnifying optical system 30 serving as an auxiliary optical system is disposed on the light path between the half-mirror 100 and the photoelectric detector 8. This magnifying optical system 30 is an optical system for increasing the imaging magnification of the opening 3a imaged on the light receiving surface of the photoelectric detector 8. A defocus derived from the influence of the pattern on the substrate surface 7a can be thereby prevented.

Concretely, the focal position detecting apparatus in this embodiment includes a driving unit $M_2$ for moving the magnifying optical system 30 between a position on the light path and a position off the light path. The apparatus also includes a detection head 170, provided outwardly of an unillustrated lens barrel for the objective lens 6, for reading the marks containing the magnification information on the magnifications of the objective lens 6. The apparatus further includes the control unit 150 for controlling the driving unit $M_2$ on the basis of this magnification information.

Then, this control unit 150 drives, when the magnification of the objective lens 6 is low in the magnification information through the detection head 170, the driving unit $M_2$ to locate the magnifying optical system 30 on the light path. Further, the control unit 150 drives, when the magnification of the objective lens 6 is high in the magnification information through the detection head 170, the driving unit $M_2$ to retract the magnifying optical system 30 from the light path. The quantity-of-light center deviation quantity due to the influence by the substrate surface 7a can be thereby reduced. Therefore, the position of the substrate surface 7a can be accurately detected.

Note that this embodiment provides a construction, wherein the magnifying optical system 30 is moved on and off the light path so as not to lose the conjugate relationship between the light receiving surface and the substrate surface 7a. Further, an afocal light path made formed in the light path extending from the substrate surface 7a to the light receiving surface. The magnifying optical system may also be disposed within this afocal light path. Besides, the magnifying optical system 30 may be, as a matter of course, manually moved on and off the light path.

Moreover, the above-described fourth embodiment illustrated in FIG. 9 has presented the example where the defocus caused by the influence of the pattern on the substrate surface 7a can be prevented by moving the magnifying optical system 30 on and off the light path. As indicated by a dotted line in FIG. 9, however, the light intercepting plate 9 may be disposed in a position spaced a predetermined distance from the light receiving surface of the detector 8, this plate 9 serving to intercept the beam at the left half of the light receiving surface of the detector 8. This arrangement is effective because of enabling both an elimination of the reflected light from the rear surface of the detected object 7 and a detection of the detected object surface with a much higher accuracy.

In this case, the first position A is set conjugate to the surface 7a of the detected object when the surface 7a of the detected object is located flush with the fiducial object plane $P_0$ of the objective optical system (synthetic system of the objective-lens 6 and the magnifying optical system 30). The position B is set conjugate to the rear surface 7b of the detected object when the surface 7a of the detected object is located flush with the fiducial object plane $P_0$ of the objective optical system (6, 30) (in-focus state). It is desirable that the light intercepting plate 9 be disposed to, as in the case of the condition (1), satisfy the following condition (14):

$$0 < d < L \quad (14)$$

where L is the distance from the first position A to the second position B along the optical axis of the objective optical system (6, 30), and d is the distance from the first position A to the light intercepting plate 9 along the optical axis of the objective optical system (6, 30).

Further, as in the case of the condition (2), it is more desirable to satisfy the following condition (15):

$$0 < d < \left| \frac{2t\beta_1^2 f_{12}}{2t\beta_1 + nf_{11}} \right| \quad (15)$$

where d is the distance from the photoelectric detector 8 to the light intercepting plate 9 along the optical axis, n is the refractive index of the substrate 7 with respect to a wavelength of the focus detection light, t is the thickness of the substrate 7, $\beta_1$ is the lateral magnification of the objective optical system (6, 30) when the substrate surface 7a is flush with the object plane (fiducial position) $P_0$ of the objective optical system (6, 30) (in-focus), $f_{11}$ is the focal length of the objective optical system (6, 30) on the side of the detected surface (object side), and $f_{12}$ is the focal length of the objective optical system (6, 30) on the detection side (image side).

Further, in this case, a detection range when the substrate surface 7a deviates upward from the fiducial object plane $P_0$ of the objective optical system (6, 30) is equalized to a detection range when the substrate surface 7a deviates downward from the fiducial object plane $P_0$ of the objective optical system (6, 30). For this purpose, it is more desirable to meet the following condition (16) as in the case of the condition (2).

$$d = \left| \frac{t\beta_1^2 f_{12}}{2t\beta_1 + nf_{11}} \right| \quad (16)$$

Figure 10:
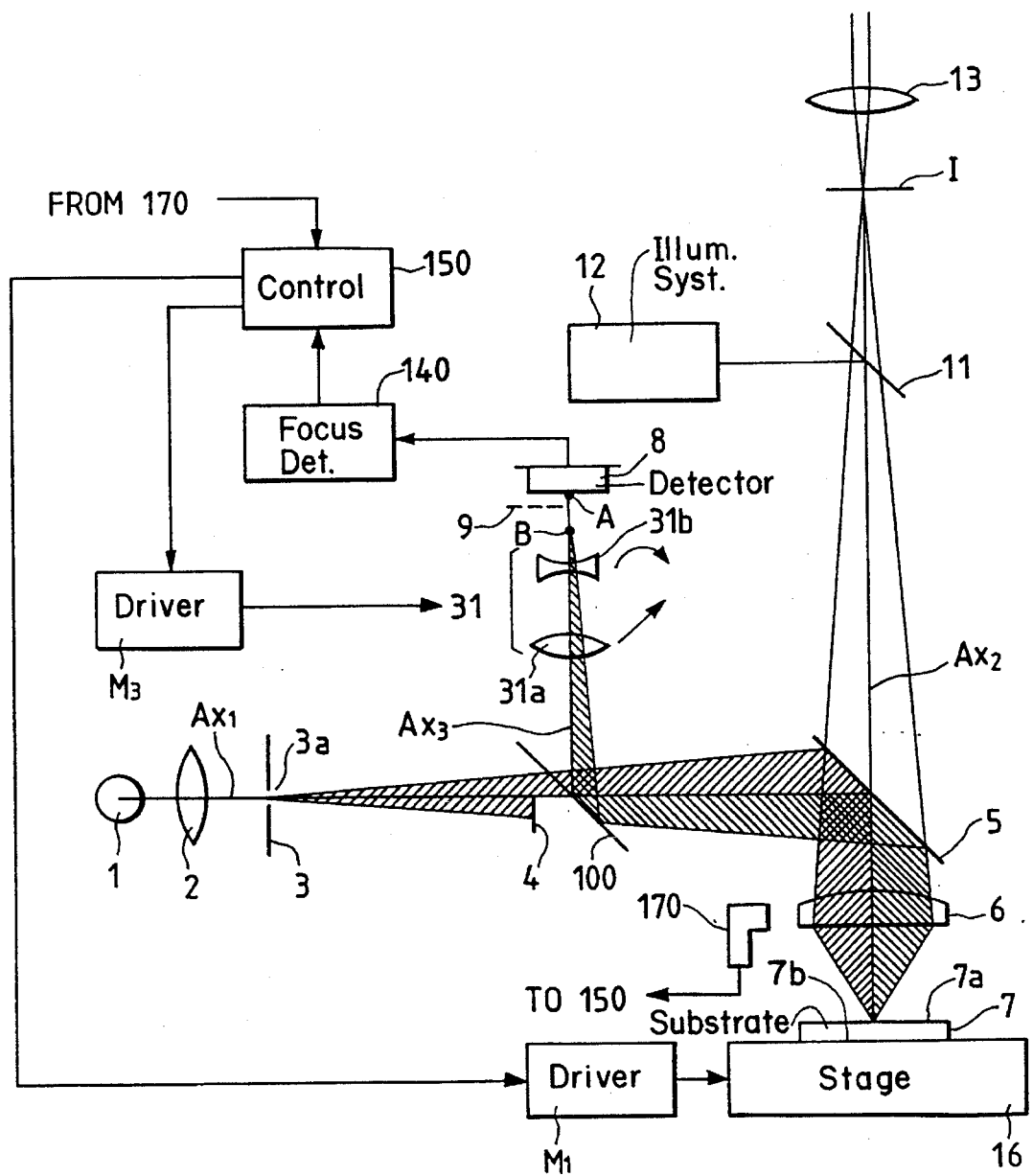
FIG. 10 is a view schematically illustrating a fifth embodiment in which the position detecting apparatus of this invention is applied to the microscope.

Given next is an explanation of a fifth embodiment where the position detecting apparatus of this invention is applied to the focus detecting apparatus for the microscope with reference to FIG. 10. Note that in FIG. 10, the members having the same functions as those in the fourth embodiment illustrated in FIG. 9 are marked with the like symbols. For simplicity, only a different point from the fourth embodiment will be explained.

Turning to FIG. 10, the different point from the fourth embodiment illustrated in FIG. 9 is that a zoom optical system 31 capable of continuously varying the magnification is provided as an auxiliary optical system. This zoom optical system 31 is constructed of a lens 31a exhibiting a positive refracting power and a lens 31b exhibiting a negative refracting power. The magnification thereof is varied by increasing or decreasing an air spacing between the two lenses. Then, a zoom driving unit $M_3$ controlled by the control unit 150 is provided for increasing or decreasing the lens-to-lens air spacing. Then, the control unit 150 controls the zoom driving unit $M_3$ to make proper the magnification of the zoom optical system 31 on the basis of the magnification information through the detection head 170.

Herein, for example, if the magnification of the objective lens 6 is high, the control unit 150 drives the zoom driving unit $M_3$ to reduce an enlarging magnification of the zoom optical system 31. Further, for instance, if the magnification of the objective lens 6 is low, the control unit 150 drives the zoom driving unit $M_3$ to increase the enlarging magnification of the zoom optical system 31.

Incidentally, in this embodiment, a variable-power range of the zoom optical system 31 is set so that the lowest magnification is present when the objective lens has the highest magnification, whereas the highest magnification is present when the objective lens 6 has the lowest magnification.

Besides, in accordance with this embodiment, when installing the objective lenses having magnifications different from each other in respective positions of the revolver, the following construction may be available. The individual objective lenses are installed in predetermined positions of the revolver. A detecting means for detecting a setting position of a revolver is provided in place of the detection head 170. Based on a signal transmitted from this detecting means, the control unit 150 sets the magnification of the zoom optical system 31.

Moreover, as in the illustrative embodiment of FIG. 2, the relay optical system 20 may be disposed between the objective lens 6 and the photoelectric detector 8 by applying the construction of the above-mentioned fifth embodiment shown in FIG. 10. Additionally, instead of the zoom optical system 31 (auxiliary optical system) disposed between the objective lens 6 and the relay optical system 20, the relay optical system 20 itself is made to incorporate a zoom function and may be allowed to function substantially as the zoom optical system 31 (auxiliary optical system).

Further, the fifth embodiment illustrated in FIG. 10 has shown the example where the defocus due to the influence of the pattern on the substrate surface 7a can be prevented by varying the magnification through the zoom optical system 31. As indicated by the dotted line in FIG. 10, however, the light intercepting plate 9 for intercepting the beam at the left half of the light receiving surface of the detector 8 may be disposed in a position spaced a predetermined distance from the light receiving surface of the detector 8. This arrangement is effective because of enabling both the elimination of the reflected light from the rear surface of the detected object 7 and the detection of the surface of the detected object with a still higher accuracy.

In this case, the first position A is set conjugate to the surface 7a of the detected object when the surface 7a of the detected object is located flush with the fiducial object plane $P_0$ of the objective optical system (synthetic system of the objective lens 6 and the zoom optical system 31). The position B is set conjugate to the rear surface 7b of the detected object when the surface 7a of the detected object is located flush with the fiducial object plane $P_0$ of the objective optical system (6, 31) (in-focus state). It is desirable that the light intercepting plate 9 be disposed to, as in the case of the condition (1), satisfy the following condition (17):

$$0 < d < L \qquad (17)$$

where L is the distance from the first position A to the second position B along the optical axis of the objective optical system (6, 31), and d is the distance from the first position A to the light intercepting plate 9 along the optical axis of the objective optical system (6, 31).

Further, as in the case of the condition (2), it is more desirable to satisfy the following condition (18):

$$0 < d < \left| \frac{2t\beta_1^2 f_{12}}{2t\beta_1 + nf_{11}} \right| \qquad (18)$$

where d is the distance from the photoelectric detector 8 to the light intercepting plate 9 along the optical axis, n is the refractive index of the substrate 7 with respect to a wavelength of the focus detection light, t is the thickness of the substrate 7, $\beta_1$ is the lateral magnification of the objective optical system (6, 31) when the substrate surface 7a is flush with the object plane (fiducial position) $P_0$ of the objective optical system (6, 31) (in-focus), $f_{11}$ is the focal length of the objective optical system (6, 31) on the side of the detected surface (object side), and $f_{12}$ is the focal length of the objective optical system (6, 31) on the detection side (image side).

Further, in this case, a detection range when the substrate surface 7a deviates upward from the fiducial object plane $P_0$ of the objective optical system (6, 31) is equalized to a detection range when the substrate surface 7a deviates downward from the fiducial object plane $P_0$ of the objective optical system (6, 31). For this purpose, it is more desirable to meet the following condition (19) as in the case of the condition (2).

$$d = \left| \frac{t\beta_1^2 f_{12}}{2t\beta_1 + nf_{11}} \right| \qquad (19)$$

Figure 11:
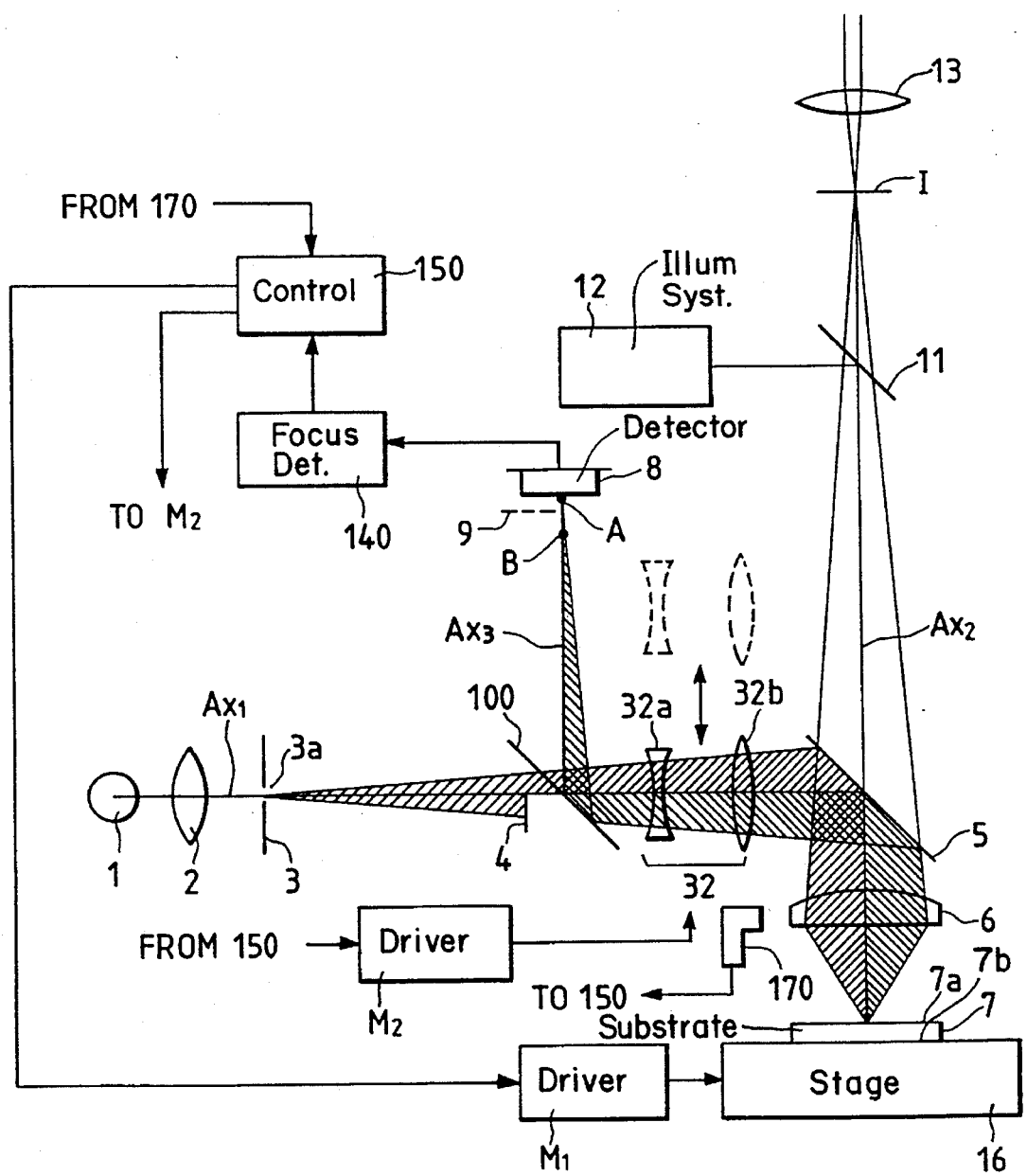
FIG. 11 is a view schematically illustrating a sixth embodiment in which the position detecting apparatus of this invention is applied to the microscope.

Given next is an explanation of a sixth embodiment of the focal position detecting apparatus of this invention with reference to a schematic view of FIG. 11. In FIG. 11, the members having the same functions as those in the fourth embodiment illustrated in FIG. 9 are marked with the like symbols. Hereinafter, for simplicity, only a different point from the fourth embodiment will be explained.

Turning to FIG. 11, the different point from the fourth embodiment illustrated in FIG. 9 is that a magnifying optical system 32 as an auxiliary optical system is so provided as to be settable on and off the light path between the half-mirror 100 and the dichroic mirror 5. This magnifying optical system 32 is a magnification change lens system constructed of a lens 32a exhibiting a negative refracting power and a lens 32b exhibiting a positive refracting power. Herein, an imaging magnification on the substrate surface 7a in association with the light traveling through the magnifying optical system 32 from the side of the lens 32a is smaller than through no intermediary of the magnifying optical system 32. An imaging magnification of the opening 3a on the light receiving surface is also larger than through no intermediary of the magnifying optical system 32, this magnification being associated with the light reflected by the substrate surface 7a and penetrating the magnifying optical system 32 from the side of the lens 32b after passing through the objective lens 6. Then, the image of the opening reimaged on the light receiving surface is formed by the light penetrating the magnifying optical system 32 from the lens 32a and the light penetrating the magnifying optical system 32 from the lens 32b. Hence, the imaging magnification of this image is the same irrespective of whether the magnifying optical system 32 is disposed on the light path or not. It is thereby possible to detect the image of the opening 3a on the light receiving surface at all times under the same conditions.

Note that the sixth embodiment illustrated in FIG. 11 has presented the example where the defocus derived from the influence of the pattern on the substrate surface 7a can be prevented by moving the magnifying optical system 32 on and off the light path. As indicated by the dotted line in FIG. 11, however, the light intercepting plate 9 for intercepting the light at the left half of the light receiving surface of the detector 8 may be disposed in a position spaced a predetermined distance from the light receiving surface of the detector 8. This arrangement is effective because of enabling both the elimination of the reflected light from the rear surface of the detected object 7 and the detection of the surface of the detected object with a much higher accuracy.

In this case, the first position A is set conjugate to the surface 7a of the detected object when the surface 7a of the detected object is located flush with the fiducial object plane $P_0$ of the objective optical system (synthetic system of the objective lens 6 and the magnifying optical system 32). The position B is set conjugate to the rear surface 7b of the detected object when the surface 7a of the detected object is located flush with the fiducial object plane $P_0$ of the objective optical system (6, 32) (in-focus state). It is desirable that the light intercepting plate 9 be disposed to, as in the case of the condition (1), satisfy the following condition (20):

$$0<d<L \tag{20}$$

where L is the distance from the first position A to the second position B along the optical axis of the objective optical system (6, 32), and d is the distance from the first position A to the light intercepting plate 9 along the optical axis of the objective optical system (6, 32).

Further, as in the case of the condition (2), it is more desirable to satisfy the following condition (21):

$$0<d<\left|\frac{2t\beta_1^2 f_{12}}{2t\beta_1 + nf_{11}}\right| \tag{21}$$

where d is the distance from the photoelectric detector 8 to the light intercepting plate 9 along the optical axis, n is the refractive index of the substrate 7 with respect to a wavelength of the focus detection light, t is the thickness of the substrate 7, $\beta_1$ is the lateral magnification of the objective optical system (6, 32) when the substrate surface 7a is flush with the object plane (fiducial position) $P_0$ of the objective optical system (6, 32) (in-focus), $f_{11}$ is the focal length of the objective optical system (6, 32) on the side of the detected surface (object side), and $f_{12}$ is the focal length of the objective optical system (6, 32) on the detection side (image side).

Further, in this case, a detection range when the substrate surface 7a deviates upward from the fiducial object plane $P_0$ of the objective optical system (6, 32) is equalized to a detection range when the substrate surface 7a deviates downward from the fiducial object plane $P_0$ of the objective optical system (6, 32). For this purpose, it is more desirable to meet the following condition (22) as in the case of the condition (2).

$$d=\left|\frac{t\beta_1^2 f_{12}}{2t\beta_1 + nf_{11}}\right| \tag{22}$$

Finally, a seventh embodiment of the focus detecting apparatus of this invention will be explained with reference to a schematic view of FIG. 12. Note that in FIG. 12, the members having the same functions as those in the fourth embodiment illustrated in FIG. 9 are marked with the like symbols. For simplicity, only a different point from the fourth embodiment will be explained.

In the seventh embodiment illustrated in FIG. 12, the difference from the fourth embodiment of FIG. 9 is given as below. Three photoelectric detectors 81, 82, 83 are provided. A magnifying optical system 33a (a first auxiliary optical system) for changing the magnification from the substrate surface 7a to the light receiving surface to a predetermined enlarging magnification is provided on the (front) side of the objective lens 6 of one photoelectric detector 82 among these photoelectric detectors 81, 82, 83. Provided also on the (front) side of the objective lens 6 of another photoelectric detector 83 is a reduction optical system 33b (a second auxiliary optical system) for changing the magnification from the substrate surface to the light receiving surface to a predetermined reducing magnification.

Then, the light intercepting plate 4 intercepts a lower half of the infrared beam with respect to the optical axis $Ax_1$ which is emitted from the opening 3a of the slit 3. Thereafter, the beam reaches the substrate surface 7a via the half-mirrors 100, 50 and the objective lens 6. The beam reflected by this substrate surface 7a is split by the half-mirror 50. The beam penetrating the half-mirror 50 is reflected by the dichroic mirror 10 which reflects the infrared light and reaches the photoelectric detector 83 via the reducing optical system 33b. Further, the beam reflected by the half-mirror 50 is also reflected by the half-mirror 100. The beam reflected by the half-mirror 101 reaches the photoelectric detector 81. The beam penetrating the half-mirror 101 comes to the photoelectric detector 82 via the magnifying optical system 33a. The focus detecting portion 140 detects a position of the substrate surface 7a from outputs of the photoelectric detectors 81, 82, 83. Detection outputs of the respective photoelectric detectors 81, 82, 83 are transmitted to the control unit 150. Then, the control unit 150 selects one of the above-mentioned detection outputs on the basis of the magnification information from the detection head 170 for reading the magnification information on the objective lens 6. The position of the substrate surface 7a is detected based on this selected detection output. For instance, if the magnification of the objective lens 6 is low, an output signal from the photoelectric detector 82 is selected. If the magnification of the objective lens 6 is intermediate, an output signal from the photoelectric detector 81 is selected. If the magnification of the objective lens 6 is high, an output signal from the photoelectric detector 83 is detected.

No matter how high the magnification of the objective lens 6 may be, the position of the substrate surface 7a can be thereby detected with the high accuracy.

Figure 12:
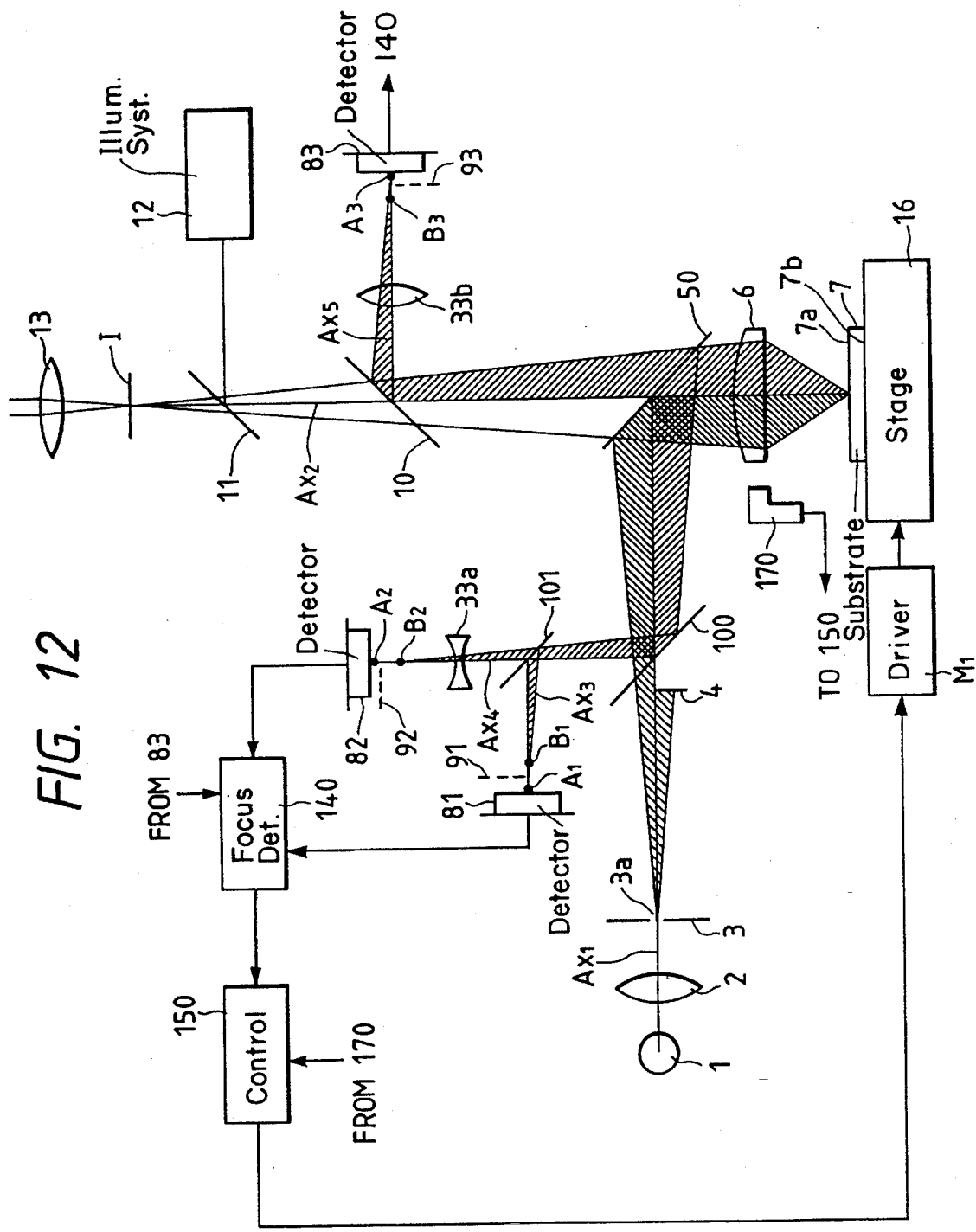
FIG. 12 is a view schematically illustrating a seventh embodiment in which the position detecting apparatus of this invention is applied to the microscope.

Note that light intercepting plates (91–93) for intercepting the light to halves of the light receiving surfaces of the respective detectors (81–83) may, as indicated by dotted lines in FIG. 12, be disposed in positions spaced predetermined distances from the light receiving surfaces of the detectors (81–83). The arrangement is effective because of enabling both the elimination of the reflected light from the rear surface of the detected object 7 and the detection of the surface of the detected object with the much higher accuracy.

First positions $A_1$, $A_2$, $A_3$ are those (of the light receiving surface of the photoelectric detectors) conjugate to the surface 7a of the detected object when the surface 7a of the detected object is located flush with the fiducial object plane $P_0$ of each of the objective optical systems (the object lens 6 for the light intercepting plate 91, the synthetic system of the objective lens 6 and the magnifying optical system 33a for the light intercepting plate 92, and the synthetic system of the objective lens 6 and the reducing optical system 33b for the light intercepting plate 93) (in-focus state). Second positions $B_1$, $B_2$, $B_3$ are those conjugate to the rear surface 7b of the detected object when the surface 7a of the detected object is located flush with the fiducial object plane $P_0$ of each of the objective optical systems (the objective lens 6, the synthetic system (6, 33a) and the synthetic system (6, 33b)) (in-focus state). It is desirable that the light intercepting plates (91–93) be disposed to satisfy the following conditions (23)–(25) as in the case of the condition (1).

$$0<d_1<L_1 \tag{23}$$

$$0<d_2<L_2 \tag{24}$$

$$0 < d_3 < L_3 \quad (25)$$

were $L_1$, $L_2$, $L_3$ are the distances from the first positions ($A_1$–$A_3$) to the second positions ($B_1$–$B_3$) along the optical axes of the objective optical systems (($6$), ($6, 33a$), ($6, 33b$)), and $d_1$, $d_2$, $d_3$ are the distances from the first positions ($A_1$–$A_3$) to the light intercepting plates ($91$–$93$) along the optical axes of the objective optical systems (($6$), ($6, 33a$), ($6, 33b$)).

Further, as in the case of the condition (2), it is more desirable to satisfy the following conditions (26)–(28):

$$0 < d_1 < \left| \frac{2t\beta_{11}^2 f_{121}}{2t\beta_{11} + n f_{111}} \right| \quad (26)$$

$$0 < d_2 < \left| \frac{2t\beta_{12}^2 f_{122}}{2t\beta_{12} + n f_{112}} \right| \quad (27)$$

$$0 < d_3 < \left| \frac{2t\beta_{13}^2 f_{123}}{2t\beta_{13} + n f_{113}} \right| \quad (28)$$

where $d_1$, $d_2$, $d_3$ are the distances from the first positions ($A_1$–$A_3$) to the light intercepting plates ($91$–$93$) along the optical axis, n is the refractive index of the substrate 7 with respect to a wavelength of the focus detection light, t is the thickness of the substrate 7, $\beta_1$, $\beta_2$, $\beta_3$ are the lateral magnifications of the objective optical systems (($6$), ($6, 33a$), ($6, 33b$)) when the substrate surface $7a$ is located flush with the object plane (fiducial position) $P_0$ (in-focus state), $f_{111}$, $F_{112}$, $f_{113}$ are the focal lengths of the objective optical systems (($6$), ($6, 33a$), ($6, 33b$)) on the side of the detected surface (object side), and $f_{121}$, $f_{122}$, $f_{123}$ are the focal lengths of the objective optical systems (($6$), ($6, 33a$), ($6, 33b$)) on the detection side (image side).

Further, in this case, detection ranges when the substrate surface $7a$ deviates upward from the fiducial object plane $P_0$ of each of the objective optical systems (($6$), ($6, 33a$), ($6, 33b$)) are equalized to detection ranges when the substrate surface $7a$ deviates downward from the fiducial object plane $P_0$ of each of the objective optical systems (($6$), ($6, 33a$), ($6, 33b$)). For this purpose, it is more desirable to meet the following conditions (29)–(31) as in the case of the condition (2).

$$d_1 = \left| \frac{t\beta_{11}^2 f_{121}}{2t\beta_{11} + n f_{111}} \right| \quad (29)$$

$$d_2 = \left| \frac{t\beta_{12}^2 f_{122}}{2t\beta_{12} + n f_{112}} \right| \quad (30)$$

$$d_3 = \left| \frac{t\beta_{13}^2 f_{123}}{2t\beta_{13} + n f_{113}} \right| \quad (31)$$

Note that each embodiment discussed above has shown the example where the present invention is applied to the focus detection of the microscope. The present invention is not, however, limited to this but may be, as a matter of course, applicable to the focal or positional detections of other apparatuses.

It is apparent that, in this invention, a wide range of different working modes can be formed based on the invention without deviating from the spirit and scope of the invention. This invention is not restricted by its specific working modes except being limited by the appended claims.

What is claimed is:

1. A position detecting apparatus for detecting a matching state of a position of a light-transmissive object with respect to a fiducial object plane of an objective optical system, said apparatus comprising:

an illumination system for projecting light to said object through a first part of said objective optical system at one side of a plane including an optical axis of said objective optical system;

a detector for photoelectrically detecting light reflected from a front surface of said object through a second part of said objective optical system at an opposite side of said plane; and a light intercepting member movable along the optical axis of said objective optical system on a light path between said objective optical system and said detector, for preventing light reflected from a rear surface of said object, through said second part, from reaching said detector.

2. The position detecting apparatus according to claim 1, further comprising a thickness detector for detecting a thickness of said object, a calculating device for calculating an optimum position of said light intercepting member in accordance with an output from said thickness detector, and a driver for moving said light intercepting member along the optical axis of said objective optical system in accordance with an output from said calculating device.

3. A position detecting apparatus for detecting a matching state of a position of a surface of an object with respect to a fiducial object plane of an objective optical system, said apparatus comprising:

a projection system for projecting a predetermined pattern on a front surface of said object through a first part of said objective optical system at one side of a plane including an optical axis of said objective optical system;

a detector for photoelectrically detecting an image of said pattern reflected from said front surface of said object through a second part of said objective optical system at an opposite side of said plane;

a light intercepting member, disposed on a light path between said objective optical system and said detector, for preventing light reflected from a rear surface of said object through said second part, from reaching said detector; and an auxiliary optical system, disposed on a light path between said objective optical system and said detector, for varying a magnification of said pattern image formed on a light receiving surface of said detector.

4. A position detecting apparatus for detecting a matching state of a position of a surface of an object with respect to a fiducial object plane of an objective optical system, said apparatus comprising:

a projection system for projecting a predetermined pattern on said surface of said object through a first part of said objective optical system at one side of a plane including an optical axis of said objective optical system;

a detector for photoelectrically detecting an image of said pattern reflected from said surface of said object through a second part of said objective optical system at an opposite side of said plane; and an auxiliary optical system, disposed on a light path between said objective optical system and said detector, for varying a magnification of said pattern image formed on a light receiving surface of said detector.

5. The position detecting apparatus according to claim 4, wherein said auxiliary optical system includes a zoom optical system having a plurality of movable lenses moving along the optical axis, and the magnification of said pattern image continuously varies with movements of said plurality of lenses along the optical axis.

6. The position detecting apparatus according to claim 5, further comprising a driver for moving said plurality of movable lenses of said zoom optical system along the optical axis, a magnification detector for detecting a magnification of said objective optical system and a controller for controlling said driver in accordance with an output from said magnification detector.

7. The position detecting apparatus according to claim 4, wherein said auxiliary optical system is so provided as to be settable on and off said light path, for varying the magnification, and the magnification of said pattern image is discontinuously varied by setting said magnification varying optical system on and off said light path.

8. The position detecting apparatus according to claim 7, further comprising a driver for moving said auxiliary optical system on and off said light path, a magnification detector for detecting a magnification of said objective optical system and a controller for controlling said driver in accordance with an output from said magnification detector.

9. A position detecting apparatus for detecting a matching state of a position of a light-transmissive object with respect to a fiducial object plane of an objective optical system, said apparatus comprising:

an illumination system for projecting light to said object through a first part of said objective optical system at one side of a plane including an optical axis of said objective optical system;

a detector for photoelectrically detecting light reflected from a front surface of said object through a second part of said objective optical system at an opposite side of said plane; and a light intercepting member disposed on a light path between said objective optical system and said detector for preventing light reflected from a rear surface of said object, through said second part, from reaching said detector;

wherein said light intercepting member is disposed between a first position conjugate to said front surface of said object when said front surface of said object is located flush with said fiducial object plane of said objective optical system and a second position conjugate to said rear surface of said object when said front surface of said object is located flush with said fiducial object plane of said objective optical system, and said light intercepting member has a shielding portion for shielding only one side of said plane including the optical axis of said objective optical system.

10. The position detecting apparatus according to claim 9, wherein the following condition is to be satisfied:

$$0 < d < L$$

where L is the distance from said first position to said second position along the optical axis of said objective optical system, and d is the distance from said first position to said light intercepting member along the optical axis of said objective optical system.

11. The position detecting apparatus according to claim 9, wherein the following condition is to be satisfied:

$$0 < d < \left| \frac{2t\beta_1^2 f_{12}}{2t\beta_1 + nf_{11}} \right|$$

where d is the distance from said first position to said light intercepting member along the optical axis, n is the refractive index of said object with respect to a wavelength of said light projected on said object, t is the thickness of said object, $\beta_1$ is the lateral magnification of said objective optical system when said front surface of said object is located flush with said fiducial object plane of said objective optical system, $f_{11}$ is the focal length of said objective optical system on the side of said object, and $f_{12}$ is the focal length of said objective optical system on the side of said detector.

12. The position detecting apparatus according to claim 9, wherein the following condition is to be satisfied:

$$d = \left| \frac{t\beta_1^2 f_{12}}{2t\beta_1 + nf_{11}} \right|$$

where d is the distance from said first position to said light intercepting member along the optical axis, n is the refractive index of said object with respect to a wavelength of the light projected on said object, t is the thickness of said object, $\beta_1$ is the lateral magnification of said objective optical system when said front surface of said object is located flush with said fiducial object plane of said objective optical system, $f_{11}$ is the focal length of said objective optical system on the side of said object, and $f_{12}$ is the focal length of said objective optical system on the side of said detector.

13. A position detecting apparatus for detecting a matching state of a position of a light-transmissive object with respect to a fiducial object plane of an objective optical system, said apparatus comprising:

an illumination system for projecting light to said object through a first part of said objective optical system at one side of a plane including an optical axis of said objective optical system;

a detector for photoelectrically detecting light reflected from a front surface of said object through a second part of said objective optical system at an opposite side of said plane;

a light intercepting member disposed on a light path between said objective optical system and said detector for preventing light reflected from a rear surface of said object, through said second part, from reaching said detector; and a relay optical system for converging, on a light receiving surface of said detector, said reflected light from said front surface of said object which is converged on a predetermined position through said objective optical system;

wherein said light intercepting member is disposed between a first position conjugate to said front surface of said object when said front surface of said object is located flush with said fiducial object plane of said objective optical system and a second position conjugate to said rear surface of said object when said front surface of said object is located flush with said fiducial object plane of said objective optical system, and said light intercepting member has a shielding portion for shielding only one side of said plane including the optical axis of said objective optical system.

14. The position detecting apparatus according to claim 13, wherein the following condition is to be satisfied:

$$0 < d < L$$

where L is the distance from said first position to said second position along the optical axis of said objective optical system, and d is the distance from said first position to said light intercepting member along the optical axis of said objective optical system.

15. The position detecting apparatus according to claim 13, wherein the following condition is to be satisfied:

$$0 < d < \left| \frac{2t\beta_1^2\beta_2^2 f_{12} f_{22}}{2t\beta_1^2\beta_2 f_{12} - 2t\beta_1 f_{21} - n f_{11} f_{21}} \right|$$

where d is the distance from said first position to said light intercepting member along the optical axis, n is the refractive index of said object with respect to a wavelength of the light projected on said object, t is the thickness of said object, $\beta_1$ is the lateral magnification of said objective optical system when said front surface of said object is located flush with said fiducial object plane of said objective optical system, $f_{11}$ is the focal length of said objective optical system on the side of said object, $f_{12}$ is the focal length of said objective optical system on the side of said detector, $\beta_2$ is the lateral magnification of said relay optical system when said front surface of said object is located flush with said fiducial object plane of said objective optical system, $f_{21}$ is the focal length of said relay optical system on the side of said object, and $f_{22}$ is the focal length of said relay optical system on the side of said detector.

16. The position detecting apparatus according to claim 13, wherein the following condition is to be satisfied:

$$d = \left| \frac{t\beta_1^2\beta_2^2 f_{12} f_{22}}{2t\beta_1^2\beta_2 f_{12} - 2t\beta_1 f_{21} - n f_{11} f_{21}} \right|$$

where d is the distance from said first position to said light intercepting member along the optical axis, n is the refractive index of said object with respect to a wavelength of the light projected on said object, t is the thickness of said object, $\beta_1$ is the lateral magnification of said objective optical system when said front surface of said object is located flush with said fiducial object plane of said objective optical system, $f_{11}$ is the focal length of said objective optical system on the side of said object, $f_{12}$ is the focal length of said objective optical system on the side of said detector, $\beta_2$ is the lateral magnification of said relay optical system when said front surface of said object is located flush with said fiducial object plane of said objective optical system, $f_{21}$ is the focal length of said relay optical system on the side of said object, and $f_{22}$ is the focal length of said relay optical system on the side of said detector.

* * * * *